(12) United States Patent
Bumgarner et al.

(10) Patent No.: US 8,694,549 B2
(45) Date of Patent: *Apr. 8, 2014

(54) DYNAMIC MANAGEMENT OF MULTIPLE PERSISTENT DATA STORES

(75) Inventors: Bill Bumgarner, San Jose, CA (US); Christopher M. Hanson, Cupertino, CA (US); Ronald Dennis Lue-Sang, Mountain View, CA (US); Stephen E. Miner, Calabash, NC (US); Benjamin Trumbull, San Jose, CA (US); Melissa Turner, San Jose, CA (US); Andreas Wendker, Mountain View, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,214

(22) Filed: May 30, 2012

(65) Prior Publication Data

US 2012/0239692 A1 Sep. 20, 2012

Related U.S. Application Data

(63) Continuation of application No. 12/316,897, filed on Dec. 16, 2008, now Pat. No. 8,219,580, which is a continuation of application No. 11/104,221, filed on Apr. 11, 2005, now Pat. No. 7,483,882.

(51) Int. Cl.
*G06F 17/30* (2006.01)

(52) U.S. Cl.
USPC .......................................................... 707/798

(58) Field of Classification Search
USPC .................. 707/770, 706, 778, 798, 803, 810
See application file for complete search history.

(56) References Cited

U.S. PATENT DOCUMENTS

| | | | | |
|---|---|---|---|---|
| 5,577,252 A | * | 11/1996 | Nelson et al. | 718/100 |
| 5,864,864 A | * | 1/1999 | Lerner | 1/1 |
| 5,873,093 A | * | 2/1999 | Williamson et al. | 1/1 |
| 5,893,117 A | * | 4/1999 | Wang | 1/1 |
| 5,898,871 A | * | 4/1999 | Williamson et al. | 719/315 |
| 5,956,728 A | * | 9/1999 | Federighi et al. | 1/1 |
| 6,085,197 A | * | 7/2000 | Federighi et al. | 1/1 |
| 6,195,662 B1 | * | 2/2001 | Ellis et al. | 1/1 |
| 6,377,960 B1 | * | 4/2002 | Qiu et al. | 1/1 |
| 6,606,668 B1 | * | 8/2003 | MeLampy et al. | 709/241 |
| 6,732,358 B1 | * | 5/2004 | Siefert | 717/173 |
| 6,917,937 B1 | * | 7/2005 | Rubendall | 1/1 |
| 7,000,187 B2 | * | 2/2006 | Messinger et al. | 715/705 |
| 7,111,013 B2 | * | 9/2006 | Federighi et al. | 707/639 |
| 7,146,385 B1 | * | 12/2006 | Bruce | 1/1 |
| 7,243,093 B2 | * | 7/2007 | Cragun et al. | 1/1 |

(Continued)

OTHER PUBLICATIONS

Non-Final Office Action mailed on Sep. 26, 2007 for U.S. Appl. No. 11/104,221, 7 pages.

(Continued)

*Primary Examiner* — Cam-Linh Nguyen
(74) *Attorney, Agent, or Firm* — Kilpatrick Townsend & Stockton LLP

(57) ABSTRACT

Dynamic management of multiple persistent data stores is disclosed. One or more data objects are retrieved from two or more of a plurality of persistent data stores and provided to the client context in a manner such that the one or more data objects appear to the client context to come from a single source, even if in fact the objects have been retrieved from two or more different persistent stores.

27 Claims, 19 Drawing Sheets

(56) References Cited

U.S. PATENT DOCUMENTS

| | | | |
|---|---|---|---|
| 7,249,044 B2* | 7/2007 | Kumar et al. | 705/7.25 |
| 7,254,750 B1* | 8/2007 | Okun et al. | 714/47.2 |
| 7,483,882 B1 | 1/2009 | Bumgarner et al. | |
| 7,536,434 B1* | 5/2009 | Rao et al. | 709/202 |
| 7,861,253 B1* | 12/2010 | Lettington et al. | 719/328 |
| 8,219,580 B2 | 7/2012 | Bumgarner et al. | |
| 2001/0030647 A1* | 10/2001 | Sowizral et al. | 345/420 |
| 2002/0069204 A1* | 6/2002 | Kahn et al. | 707/10 |
| 2002/0077937 A1* | 6/2002 | Lyons et al. | 705/28 |
| 2002/0095357 A1* | 7/2002 | Hunter et al. | 705/27 |
| 2002/0120679 A1* | 8/2002 | Hayton et al. | 709/203 |
| 2003/0093770 A1* | 5/2003 | Fernandez | 717/118 |
| 2003/0158855 A1* | 8/2003 | Farnham et al. | 707/102 |
| 2004/0073532 A1* | 4/2004 | Hiltgen et al. | 707/1 |
| 2004/0103088 A1* | 5/2004 | Cragun et al. | 707/3 |
| 2004/0209230 A1* | 10/2004 | Beu et al. | 434/72 |
| 2004/0268259 A1* | 12/2004 | Rockey et al. | 715/708 |
| 2005/0033800 A1* | 2/2005 | Kavuri et al. | 709/201 |
| 2005/0262181 A1* | 11/2005 | Schmidt et al. | 709/200 |
| 2005/0289015 A1* | 12/2005 | Hunter et al. | 705/27 |
| 2005/0289123 A1* | 12/2005 | Dettinger et al. | 707/3 |
| 2006/0111878 A1* | 5/2006 | Pendyala et al. | 703/1 |
| 2006/0190434 A1* | 8/2006 | Dettinger et al. | 707/3 |

OTHER PUBLICATIONS

Non-Final Office Action mailed on May 12, 2008 for U.S. Appl. No. 11/104,221, 7 pages.

Notice of Allowance mailed on Sep. 29, 2008 for U.S. Appl. No. 11/104,221, 6 pages.

Non-Final Office Action mailed on Mar. 25, 2011 for U.S. Appl. No. 12/316,897, 11 pages.

Final Office Action mailed on Jul. 28, 2011 for U.S. Appl. No. 12/316,897, 9 pages.

Non-Final Office Action mailed on Dec. 1, 2011 for U.S. Appl. No. 12/316,897, 10 pages.

Notice of Allowance mailed on Mar. 29, 2012 for U.S. Appl. No. 12/316,897, 8 pages.

* cited by examiner

DYNAMIC MANAGEMENT OF MULTIPLE PERSISTENT DATA STORES

CROSS REFERENCE TO OTHER APPLICATIONS

This application is a continuation of co-pending U.S. patent application Ser. No. 12/316,897, entitled DYNAMIC MANAGEMENT OF MULTIPLE PERSISTENT DATA STORES filed Dec. 16, 2008 which is incorporated herein by reference for all purposes, which is a continuation of U.S. patent application Ser. No. 11/104,221, entitled DYNAMIC MANAGEMENT OF MULTIPLE PERSISTENT DATA STORES filed Apr. 11, 2005, now U.S. Pat. No. 7,483,882, which is incorporated herein by reference for all purposes.

BACKGROUND OF THE INVENTION

Traditional implementations of object-storage mapping frameworks focus on enterprise client/server databases and only allow for a fixed configuration of databases or persistent data stores. Such a client/server enterprise environment does not support object-storage mapping in an environment in which the set of data stores are dynamic such as in a desktop environment where the set of available data sources may change often as file systems and network resources are dynamically detected and integrated into a user's computing environment. Prior art implementations do not allow the dynamic addition or removal of persistent data stores and do not provide a corresponding synchronous growth or reduction of the visible data set available to a client context as data stores are added or removed, respectively. Such functionality is desirable when the set of data stores is possibly dynamic.

Thus, there is a need for the dynamic management of persistent data stores.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic management of multiple persistent data stores is disclosed. One or more data objects are associated with a client context, e.g., an instance of a client application program. The one or more data objects are retrieved from one or more of a plurality of persistent data stores and provided to the client context in a manner such that the one or more data objects appear to the client context to come from a single source, even if in fact the objects have been retrieved from two or more different persistent stores. In an embodiment, a persistent store coordinator is employed to manage a plurality of persistent data stores. The persistent store coordinator allows the dynamic addition or removal of the persistent data stores and grows or shrinks the visible data sets of one or more client contexts accordingly. Communication between client contexts and the persistent data stores is facilitated by the coordinator in a manner in which the data associated with the individual persistent data stores appear to be associated with a single data source to the client contexts. Thus, the persistent store coordinator provides to the client contexts a unified façade of all the data stored in the available persistent data stores.

Figure 1:
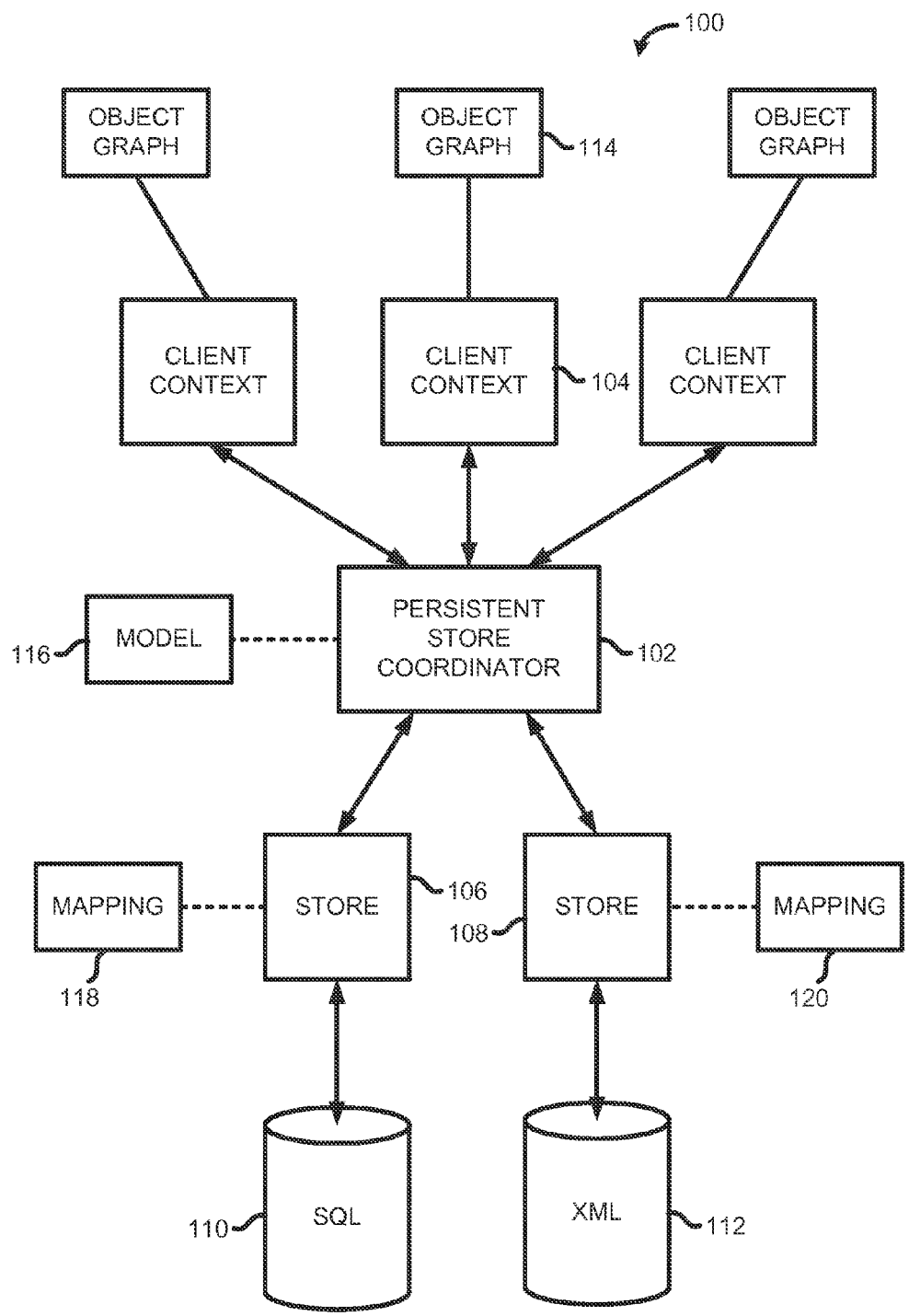
FIG. 1 illustrates an embodiment of a persistent store coordinator configured to manage dynamically multiple persistent data stores.

FIG. 1 illustrates an embodiment of a persistent store coordinator configured to manage dynamically multiple persistent data stores. In the example shown in environment 100, persistent store coordinator 102 uses store objects 106 and 108 which represent a pair of persistent data stores, structured query language (SQL) database 110 and extensible markup language (XML) file 112, respectively, to make objects stored in database 110 and file 112 available to a plurality of client contexts, such as client context 104. Each of the client contexts manages an object graph that represents the objects in memory that are in use by that client context and the relationships between related objects. As depicted in FIG. 1, client context 104 tracks the objects it is using and has stored in memory via object graph 114.

The object graphs of the client contexts are each formally described by one or more models (i.e. one or more forms of data files). Persistent store coordinator 102 realizes a single model 116 based on the summation of model(s) associated with the object graphs of the client contexts. Model 116 serves as a shared means for communication between the client contexts, such as client context 104, and persistent store coordinator 102. The specific model associated with a particular object in memory (which is part of model 116) enables persistent store coordinator 102 to infer the manner in which that particular object in memory maps into the structure of an associated persistent data store. The mapping associated with each type of object in memory can be inferred programmatically by model 116 and/or, in some embodiments, configured manually, e.g., by a developer of an application associated with client context 104. For the same object in memory, different mappings may exist for different types of persistent data stores. Based on the associated mapping, an object may be mapped into one or more tables in a database or similarly into other storage formats associated with other kinds of persistent data stores. Likewise, individual attributes of an object may be mapped to one or more fields in a database or similarly to other storage formats associated with other kinds of persistent data stores, and the type of an attribute may be switched (e.g., a number might be stored as a string or vice versa). That is, the mapping provides the translations for attributes, types, and locations of the data elements that comprise an object. Upon realization of model 116, persistent store coordinator 102 associates with each type of store object its corresponding mapping. As depicted in FIG. 1, mapping 118 is associated with store object 106, and mapping 120 is associated with store object 108. In some embodiments, when a store is added, as described more fully below, a client context that wants to access data objects associated with the new store provides to persistent store coordinator 102 "configuration" data or other information that identifies to the persistent store coordinator 102 the object(s) within the model 116 with which the client context expects to use the new store. The persistent store coordinator 102 uses this configuration information and metadata and/or other data associated with the new store to infer a mapping between the objects identified in the configuration data and the corresponding elements in the new store. For example, if a client context were to indicate it desired to use a new store in connection with its "person" and "phone" objects, the persistent store coordinator 102 might infer in one embodiment that a data element referred to as "name" in the new store maps to "person" and a "primary phone" element maps to "phone".

In the example shown, each store object, such as store objects 106 and 108, represents an external persistent data store, e.g., an SQL database, XML file, relational database management system (RDBMS), binary file, etc. A persistent data store may be located on a hard drive, on a removable storage media, on a server or workstation in a network, etc. Each store object handles access to one type of file, e.g., store object 106 represents SQL database 110 and store object 108 represents XML file 112. In some embodiments, a persistent store coordinator (PSC) such as PSC 102 may be associated with one or more client contexts and one or more store objects, each store object being associated with a single persistent data store. In some embodiments, more than one PSC may access the same persistent data store, but each uses its own associated store object to do so. In some embodiments, a store object encapsulates a concrete file format access mechanism and has an application program interface (API) that enables communication with its associated persistent data store. The mapping associated with each store identifies the manner in which object-storage mapping is implemented, i.e., the manner in which objects in memory are mapped into external data stored in persistent data stores and, likewise, the manner in which external data in persistent data stores are mapped into objects in memory. One manner in which objects are mapped to a data source is described in U.S. Pat. No. 5,873,093 entitled METHOD AND APPARATUS FOR MAPPING OBJECTS TO A DATA SOURCE issued Feb. 16, 1999, which was incorporated herein by reference above.

The client contexts, such as client context 104, may each correspond to an individual window of an application. However, the individual client contexts may be configured in a variety of ways. That is, a persistent store coordinator such as persistent store coordinator 102 can have an arbitrary number of possibly dissimilar clients. In some embodiments, multiple client contexts may communicate with the same persistent store coordinator, but each client context exclusively communicates with a single persistent store coordinator. Client contexts may be nested in their own hierarchy with parent client contexts serving to delimitate the scope of changes sub-contexts (or child client contexts) make. Each store object is managed by a single persistent store coordinator. A particular application or process may have multiple persistent store coordinators.

Figure 2:
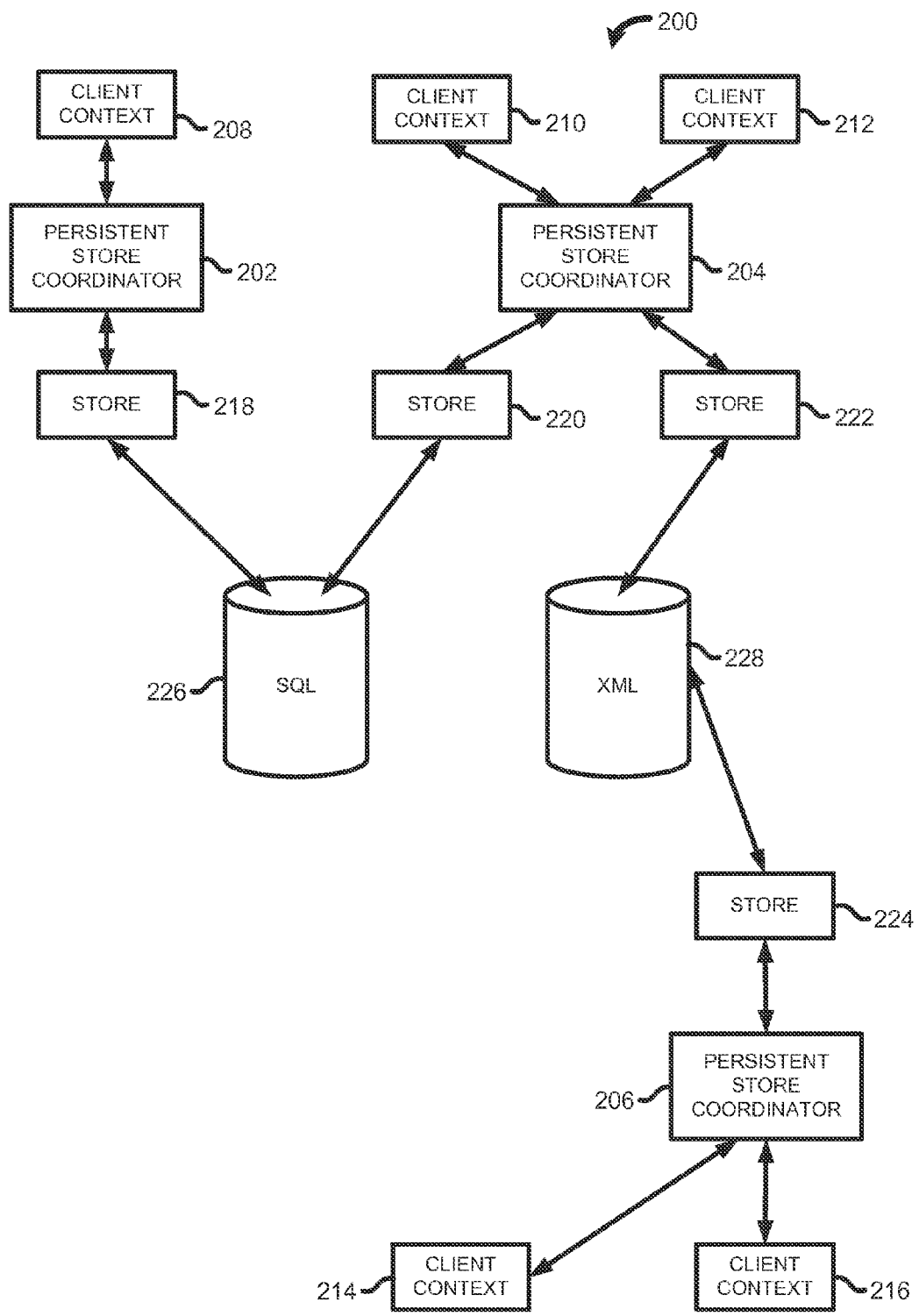
FIG. 2 illustrates an embodiment of an environment in which the store objects associated with different persistent store coordinators share the same persistent data sources.

FIG. 2 illustrates an embodiment of an environment in which the store objects associated with different persistent store coordinators share the same persistent data sources. Specifically, environment 200 includes three distinct persistent store coordinators, 202, 204, and 206, which are independent of one another. In some embodiments, each persistent store coordinator is part of a "stack" which includes the persistent store coordinator and associated client context(s) and store object(s). An application or process may be characterized by multiple stacks depending upon the requirements of the client contexts. In the example shown in FIG. 2, three stacks corresponding to the three persistent store coordinators are depicted. The object graphs, models, and mappings associated with the client contexts, persistent store coordinators, and store objects, respectively, as depicted in FIG. 1, have been omitted from FIG. 2 for conciseness.

As depicted in FIG. 2, each of the client contexts 208-216 is distinct (i.e. each client is associated with a single persistent store coordinator), and the client contexts may be associated with the same application or different applications. Similarly, each distinct store object 218-224 is managed by a single persistent store coordinator. However, multiple store objects, each of which is associated with a different persistent store coordinator, may represent the same external persistent data store and even the same data file. For instance, as depicted in FIG. 2, store objects 218 and 220 both represent SQL database 226 and store objects 222 and 224 both represent XML file 228. Thus, by employing multiple stacks, concurrent requests to each persistent data store are possible. In an embodiment in which multiple PSC's access the same persistent data store the PSC's may be configured to mediate conflicts between them automatically. Likewise, if a PSC accesses the same persistent data store for two or more client contexts, the PSC may be configured to resolve conflicts on behalf of the client contexts or defer conflict resolution to the client contexts. In some embodiments, mechanisms are provided for developers of the client contexts to handle conflicts in the most appropriate manner to fit the needs of their application. In some embodiments, conflicts resulting from multiple changes to data may be resolved by selecting one set of changes and discarding the rest (e.g., the first change or last change may be selected). In some embodiments, multiple changes are merged.

Figure 3:
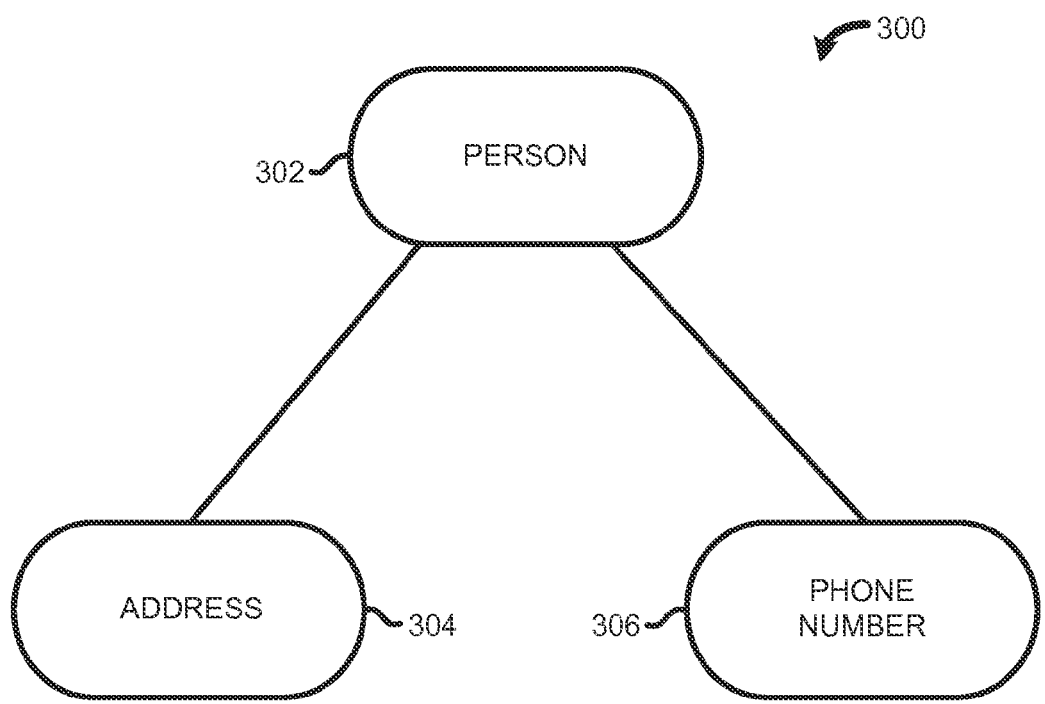
FIG. 3 illustrates an embodiment of an object graph associated with a client context.

FIG. 3 illustrates an embodiment of an object graph associated with a client context. In some embodiments, object graph 300 corresponds to object graph 114 of FIG. 1. Each client context manages an object graph, such as object graph 300, that represents the objects in memory that are in use by that client context. An object graph also provides the relationships between related objects. In some embodiments, a programming interface, such as a "container", is used by the client context to refer to the objects and the corresponding object graph associated with the client. In such embodiments, the objects of the client context are created in, run from, and managed by the container. In FIG. 3, object graph 300 includes three objects: a person object 302, an address object 304, and a phone number object 306. Object graph 300 also depicts the relationships between these three objects. Specifically, each person object 302 has an associated address object 304 and an associated phone number object 306. An object graph, such as object graph 300, is used by a client context to keep track of the objects it is using and has stored in memory and the relationships between related objects. As described above, in some embodiments a formal description of the object graph of a client context is provided to an associated persistent store coordinator via one or more models that describe the objects that comprise the object graph.

Figure 4:
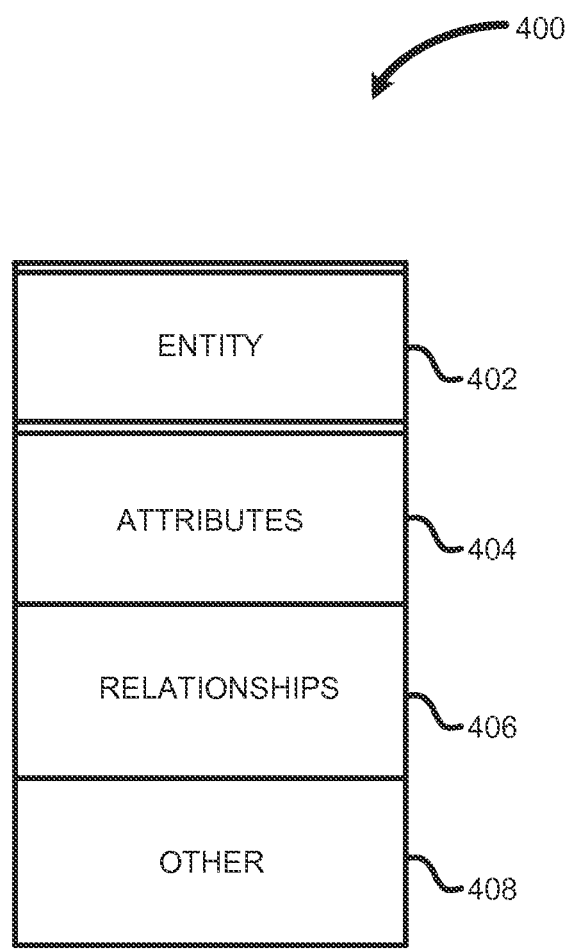
FIG. 4 illustrates an embodiment of the components of a model that is used to formally describe a particular object (or object graph) in memory.

FIG. 4 illustrates an embodiment of the components of a model that is used to formally describe a particular object (or object graph) in memory. As depicted in FIG. 4, a model includes for each type of object in an object graph associated with a client context with which a PSC is associated an entity 400. Each entity includes in the example shown an entity name 402, attribute(s) 404, relationship(s) 406, and optional an "other" component 408. An entity maps to an object class and describes a particular type of object. For example, a person entity exists for a person object, an address entity exists for an address object, etc. In some embodiments, a model exists for each type of object (i.e. entity) in memory. In some embodiments, a model includes more than one entity. An entity 400 includes one or more attributes 404 that describe the entity 400. One or more relationships 406 describe links (i.e. pointers) between related entities of a model. For example, a "person" entity may include a relationship indicating that each person object has associated with it an address object. The relationship may indicate a "target" or "destination" entity associated with the other end of the relationship (e.g., a relationship reflecting that each "person" object has an associated "address" object may point in the model to an "address" entity); a way in which the particular target object related to a particular instance of an object associated with the entity may be identified, such as a pointer, key, or other data to be used to identify the target data; and/or other information associated with the relationship. "Other" component(s) 408 may describe other types of properties and/or relationships of one or more entities that a model corresponds to. In some embodiments, "other" 408 corresponds to "fetched properties", a loosely defined relationship to a target data object which is described in detail in co-pending U.S. patent application Ser. No. 11/104,187, entitled MANAGING CROSS-STORE RELATIONSHIPS TO DATA OBJECTS filed Apr. 11, 2005, now U.S. Pat. No. 7,376,658, issued May 20, 2008, which was incorporated herein by reference for all purposes above.

Figure 5:
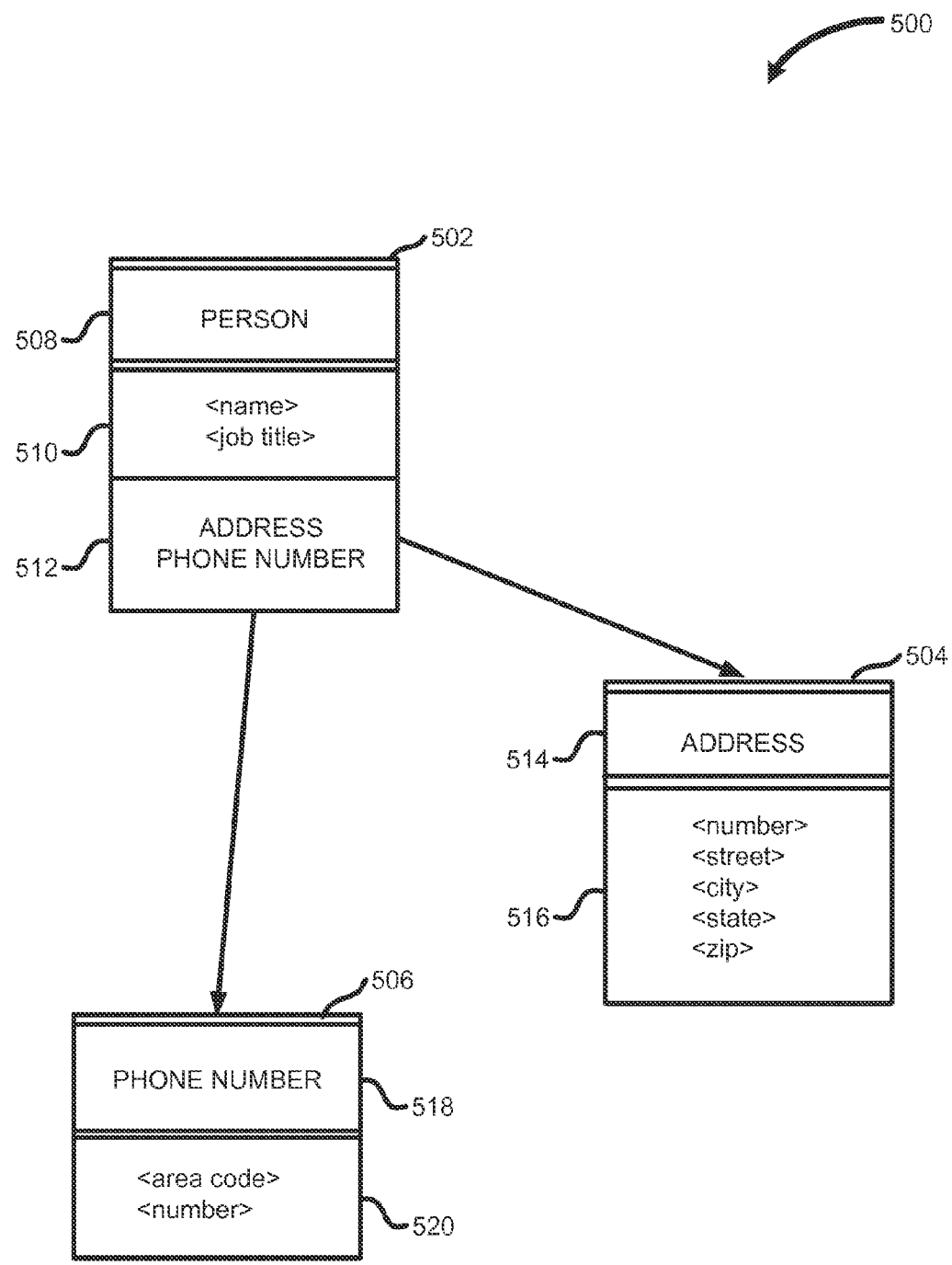
FIG. 5 illustrates an embodiment of a model that formally describes the object graph depicted in FIG. 3.

FIG. 5 illustrates an embodiment of a model that formally describes the object graph depicted in FIG. 3. The object graph of FIG. 3 includes three types of objects: a person object 302, an address object 304, and a phone number object 306. In some embodiments, each type of object is represented in a model by an associated entity. In model 500, a person entity 502 represents objects of the type (or class, e.g.,) "person", an address entity 504 represents objects of the type "address", and a phone number entity 506 represents objects of the type "phone number". Person entity 502 includes a name 508 and attributes 510: <name> and <job title>. Person entity 502 also describes relationships 512 to address entity 504 and phone number entity 506. In some embodiments, the relationships 512 may include a description of how the target data object related to a particular instance of a person object is found, e.g., the key or other data used to access the target data in a data store associated with the target object. No "other" components (i.e. 408 of FIG. 4) are associated with person entity 502 in the example shown. Address entity 504 includes an entity name 514 and attributes 516: <number>, <street>, <city>, <state>, and <zip>. No relationships or "other" components (i.e. 406 and 408, respectively, of FIG. 4) are associated with address entity 504. Phone number entity 506 includes an entity name 518 and attributes 520: <area code> and <number>. No relationships or "other" components (i.e. 406 and 408, respectively, of FIG. 4) are associated with phone number entity 506.

The entire object graph 300 of FIG. 3 is formally described by model 500, which includes the person entity 502, address entity 504, and phone number entity 506. One or more models, such as model 500, representing one or more object graphs associated with one or more client contexts are employed by a persistent store coordinator, such as persistent store coordinator 102 of FIG. 1, to realize a single, composite model, such as model 116 of FIG. 1, that enables the persistent store coordinator and associated client contexts to communicate.

In some embodiments, an object and its associated data file stored in a persistent data store may include only a subset of a model. A subset of a model, referred to herein sometimes as a "configuration", defines a subset of one or more entities of the model that is/are associated with an external data file or other persistent data store. For example, model 500 of FIG. 5 includes the person, address, and phone number entities and a particular configuration, e.g., including the person and address entities, may be associated with a particular persistent data store, such as might occur if names and addresses were stored together in one persistent store but phone numbers were stored in another, separate store.

Figure 6:
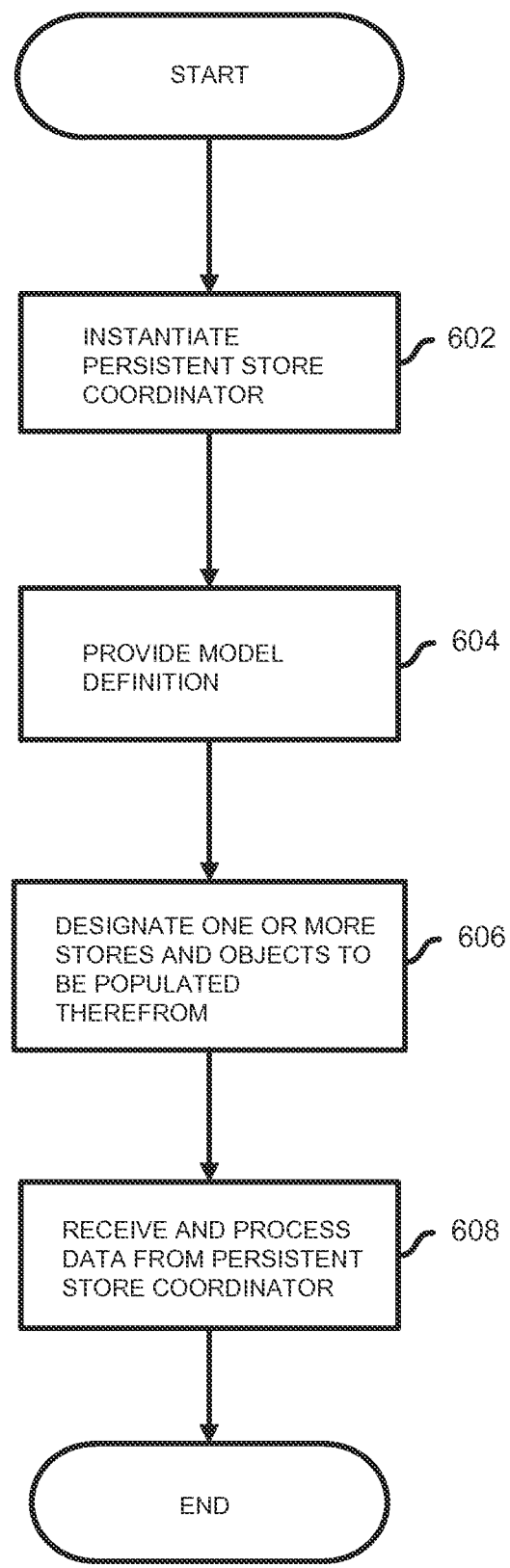
FIG. 6 illustrates an embodiment of a process used when an application is launched and a client context of the application is initialized.

FIG. 6 illustrates an embodiment of a process used when an application is launched and a client context of the application is initialized. In the example shown, at 602 a persistent store coordinator object is instantiated by the client context and/or associated application. In some embodiments, a new persistent store coordinator object is not instantiated at 602, but rather, a pre-existing persistent store coordinator object is selected to serve the initialized client context. At 604, the persistent store coordinator associated with the initialized client context is provided a model definition that formally describes the object graph managed by the client context in memory. In some embodiments, the model definition is dynamically generated when an application is launched or a client context is initialized. Alternatively, the initialized client context may already include a pre-existing model definition (e.g., if a model definition was generated during a previous run of the client context or defined or otherwise configured statically by a developer of the associated client application). At 606, the client context designates to its associated persistent store coordinator one or more persistent data stores it expects to interact with, e.g., save data to, retrieve or fetch data from, query, etc. In addition, as depicted in FIG. 6, at 606 the client context also designates one or more objects to be populated from the designated stores. In an embodiment, 606 includes an identification of a "configuration" that includes and/or describes the entities associated with the client context that are to be populated using the designated store. At 608, the data files (i.e. objects) requested from the designated stores in 606 are received by the client context from the persistent store coordinator.

Figure 7:
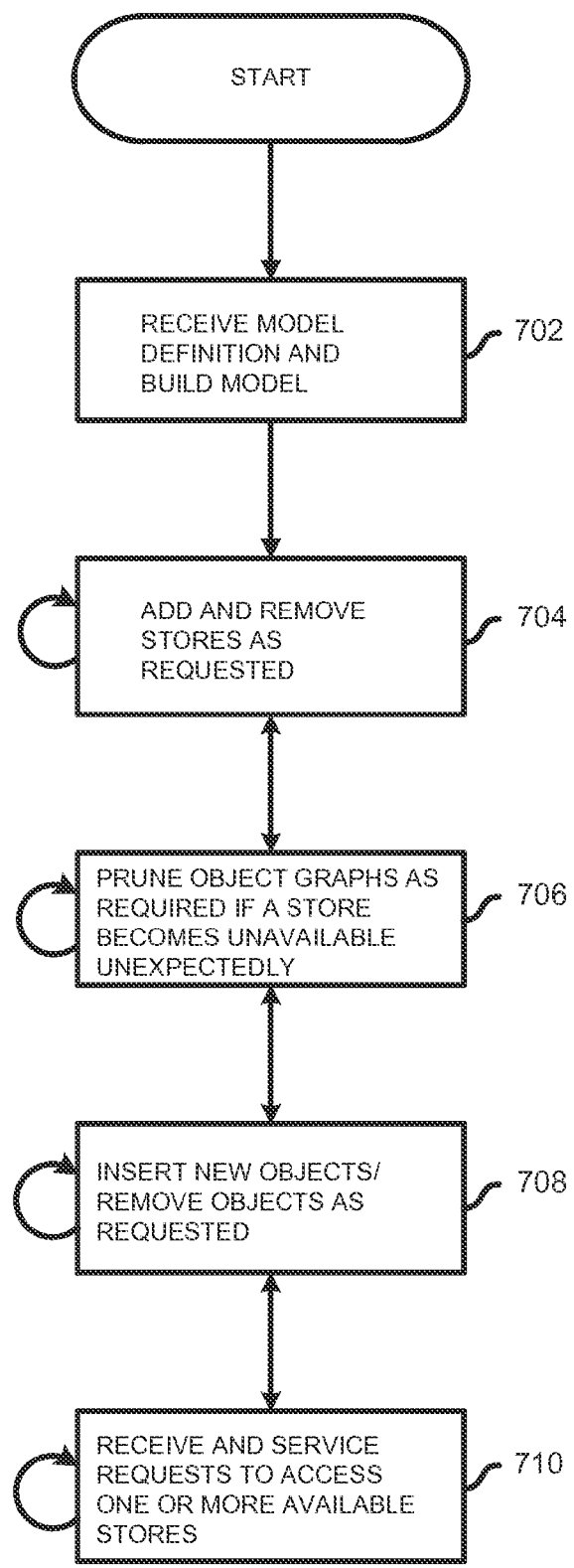
FIG. 7 illustrates an embodiment of processes performed by a persistent store coordinator.

FIG. 7 illustrates an embodiment of processes performed by a persistent store coordinator. At 702, a persistent store coordinator receives a model definition and builds (or adds to) a model based on the model definition. In some embodiments, the model definition received at 702 is the model definition provided in 604 of FIG. 6. In some embodiments, the model definition includes one or more models that define the object graphs associated with one or more client contexts associated with the persistent store coordinator. If multiple models exist, the persistent store coordinator utilizes the union of all the models to realize or build a single model that allows the persistent store coordinator to service its associated client contexts. In some embodiments, model 116 of FIG. 1 is the model built by the persistent store coordinator at 702.

In some embodiments, once a persistent store coordinator is instantiated and a model realized by the persistent store coordinator, the persistent store coordinator exclusively manages data communication between its associated client contexts and the available persistent data stores. For example, stores are dynamically added to and/or removed from the set of available persistent data stores by the persistent store coordinator as and when requested by one or more client contexts associated with the persistent store coordinator (704). If a persistent data store becomes unexpectedly unavailable (e.g., if a removable media store is unexpectedly removed, a server in the network goes down, etc.), the object graphs of the affected client contexts are pruned by the persistent store coordinator (706) so that the object graphs always reflect only the data (i.e. objects) that exist in stores currently available to the persistent store coordinator. For example, if the person and address objects of object graph 300 of FIG. 3 are externally stored in a XML file and the phone number object is externally stored in a SQL database and the SQL database is unexpectedly removed, the phone number object is pruned from the object graph. In some embodiments, 706 includes informing each affected client context that a store has become unavailable and/or informing each affected client context that specified affected objects should be pruned from the object graph associated with the client context. In some embodiments, the persistent store coordinator informs the client contexts which stores have become unavailable, and the client contexts eliminate references to objects loaded from those stores.

In some embodiments, if a persistent data store that previously became unexpectedly unavailable becomes available again, the persistent store coordinator ensures that the object graphs of the affected clients are updated, i.e. the affected objects are re-inserted into the object graphs. For the example given above, if the SQL database that stores phone numbers becomes available again, the phone number object is re-inserted into the object graph from which it was pruned when the SQL database became unexpectedly unavailable. The persistent store coordinator inserts descriptions of new objects into its model and removes descriptions of objects which are no longer in use from its model as and when it becomes aware of such changes (708). In some embodiments, 708 includes receiving requests and/or updates from one or more client contexts about the object(s) with which the client context desires to work. The persistent store coordinator receives and services requests from one or more associated client contexts to access one or more available stores (e.g. to save data to, fetch data from, query, etc.) (710). In some embodiments, such requests are serially handled by the persistent store coordinator. 704-710 may be performed by the persistent store coordinator any number of times and in any order and/or simultaneously.

In some embodiments, the persistent store coordinator represents a single access point to multiple persistent data stores. The persistent store coordinator represents multiple stores as a union to its associated client contexts. That is, all external data files from multiple persistent data stores appear to be associated with a data source to the client contexts. The dynamic removal and/or addition of persistent data stores is supported by the persistent store coordinator and conveyed by the persistent store coordinator to the client contexts by the synchronous update of affected object graphs (i.e. by pruning and/or inserting objects) of the client contexts in memory. The client contexts are completely isolated from the external persistent data stores and do not have to be concerned about the structure in which objects are persistently stored. In addition, the persistent store coordinator may provide client contexts with additional data handling functionalities. For example, the persistent store coordinator may validate data, guarantee integrity, ensure relationships, perform conversions, etc., thus relieving the client contexts of the overhead of performing such operations individually.

In some embodiments, 704 is performed each time a new store becomes available. In some embodiments, the PSC is informed when a new store becomes available (e.g., a system connects to a network or a volume of removable media is inserted into a drive) and automatically accesses the store if the PSC determines, e.g., by "sniffing" metadata or other data associated with the store, that the store is or may be of interest to one or more client contexts with which the PSC is associated. In some embodiments, the client context becomes aware of a new store becoming available and instructs the PSC to add the store as one to which the client context has access.

Figure 8:
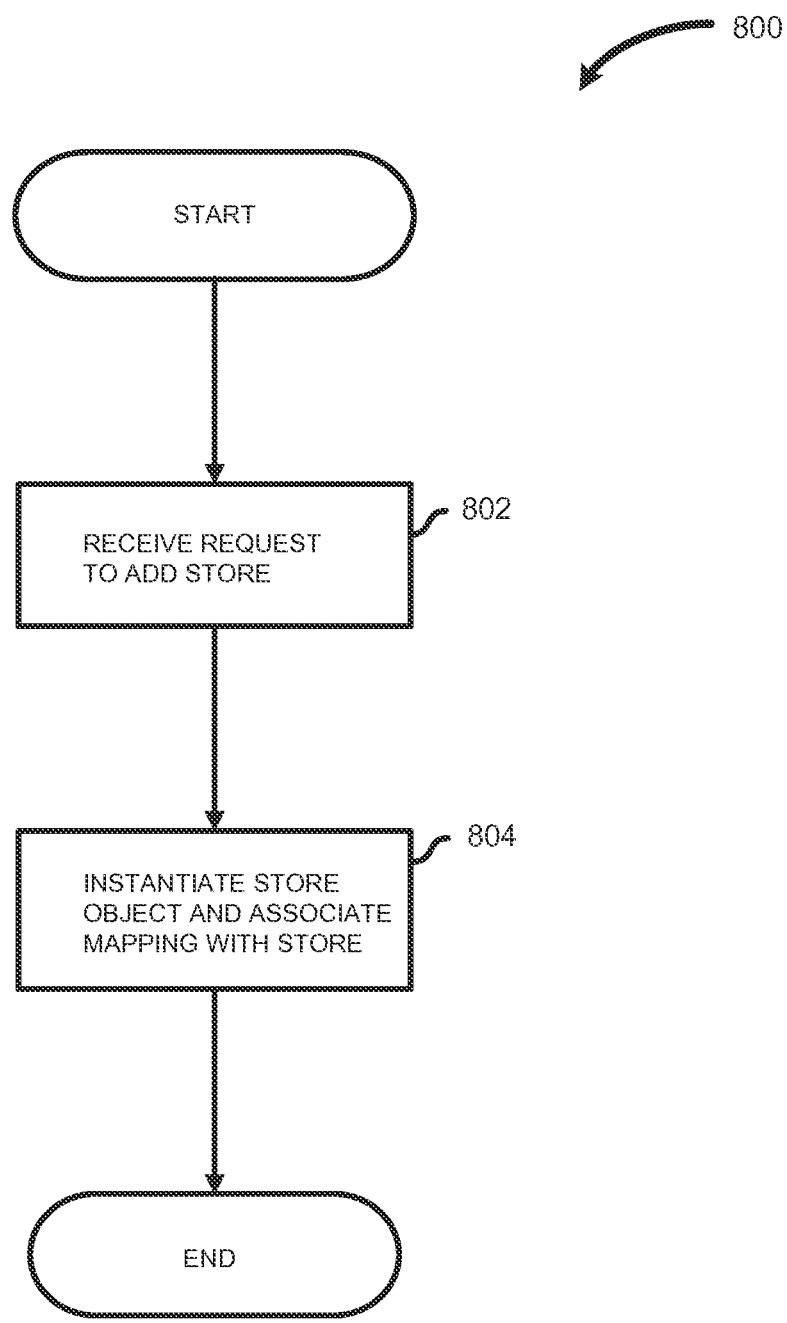
FIG. 8 illustrates an embodiment of a process used to add a persistent data store.

FIG. 8 illustrates an embodiment of a process used to add a persistent data store. In some embodiments, process 800 is used to implement 704 of FIG. 7. At 802, the persistent store coordinator receives a request to add a new store by a client context associated with the persistent store coordinator. In some embodiments, the request by a client context to its associated persistent store coordinator to add a particular persistent data store includes the location of the store, the configurations of objects it would like to populate using the store, and/or the type of the store. The location of the store may be in the form of a uniform resource identifier (URI), directory, etc. In some embodiments, the configurations of one or more objects a client context wishes to populate from the added data store can be determined by the client context by "sniffing" the metadata in the associated external data files. In some embodiments, the reading (e.g. "sniffing") and/or writing of metadata of a data file by a client context does not require facilitation by a persistent store coordinator (which is required when the actual data of the data file is read or written) and does not depend upon the type of data stored in the data file. Thus, if the configuration of an object a client context would like to populate using the store is not directly known to the client context, the metadata of the associated data file can be "sniffed" to determine the configuration. Likewise, the type of the store, i.e. the format in which data is stored in the store, (e.g., SQL, RDBMS, XML, binary, etc.), may be either explicitly supplied by the client context if it is known or may be "sniffed" from the metadata of a data file corresponding to an object the client context would like to populate using the store. In some embodiments, the type and/or other data as described above is "sniffed" by the persistent store coordinator. In some embodiments, the type of the store is implied by the external store representation on disk, and the type of the store is merged into the metadata, e.g., by the persistent store coordinator, as "permanent implied metadata".

At 804, the persistent store coordinator instantiates a store object to represent the new store added in 802 and associates a mapping with the store. In some embodiments, the persistent store coordinator uses the type of the store to instantiate an appropriate store object and realize an appropriate mapping for the added store. For example, if the added store is a SQL database, an object from the SQL store class is instantiated by the persistent store coordinator at 804; if the added store in an XML file, an object from the XML store class is instantiated by the persistent store coordinator at 804. The store object instantiated at 804 directly interacts with and facilitates data transfers between the persistent data store added at 802 and the persistent store coordinator. Also at 804, the persistent store coordinator associates with the instantiated store object a mapping that specifies the manner in which data stored in the persistent data store added at 802 maps into one or more associated objects in memory. In some embodiments, the type of a persistent data store is used by the persistent store coordinator to determine the mapping associated with that store. The type (or mapping) may be explicitly supplied by the client context or may be dynamically generated by "sniffing" the metadata associated with a data file of the store and/or otherwise programmatically inferring the mapping. In some embodiments, the type and/or mapping is automatically deduced by the persistent store coordinator whenever possible.

Figure 9:
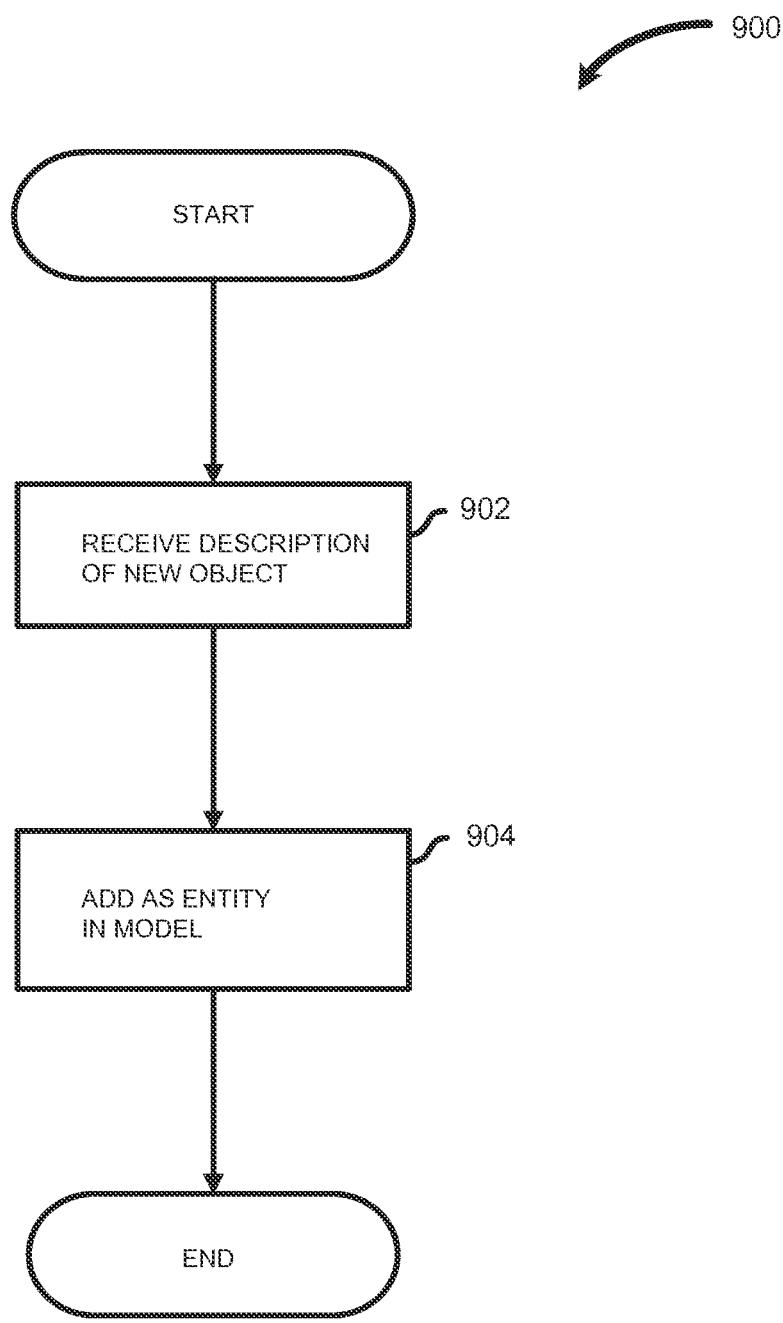
FIG. 9 illustrates an embodiment of a process used to insert a new object description into the model associated with a persistent store coordinator.

FIG. 9 illustrates an embodiment of a process used to insert a new object description into the model associated with a persistent store coordinator. In some embodiments, process 900 is used to implement 708 of FIG. 7. At 902, the persistent store coordinator receives a description of a new object added to the object graph of a client context associated with the persistent store coordinator. In some embodiments, the description of a new object received at 902 may result from the addition of a new client context to the persistent store coordinator. The description received at 902 includes a description of the type of object, e.g., a description of an entity such as those described above in connection with FIGS. 3-5. In some embodiments, the description received at 902 also includes the destination store of the new object. The destination store may be specified by a URI. If the destination store is omitted from the description of the new object received at 902, any store that can compatibly store the new object is selected by the persistent store coordinator as the destination store. In some embodiments, the first store that can persist an object of that type is selected by the persistent store coordinator as the destination store. At 904, the description of the new object received at 902 is added as an entity in the model associated with the persistent store coordinator.

In some embodiments, objects to be fetched from persistent data stores are described by a query language, i.e. "predicates", that is independent of the concrete storage mechanism (which might be SQL, XML, binary data, etc.) and gets translated by the persistent store coordinator and the store objects into the appropriate query language for each persistent data store format.

Figure 10:
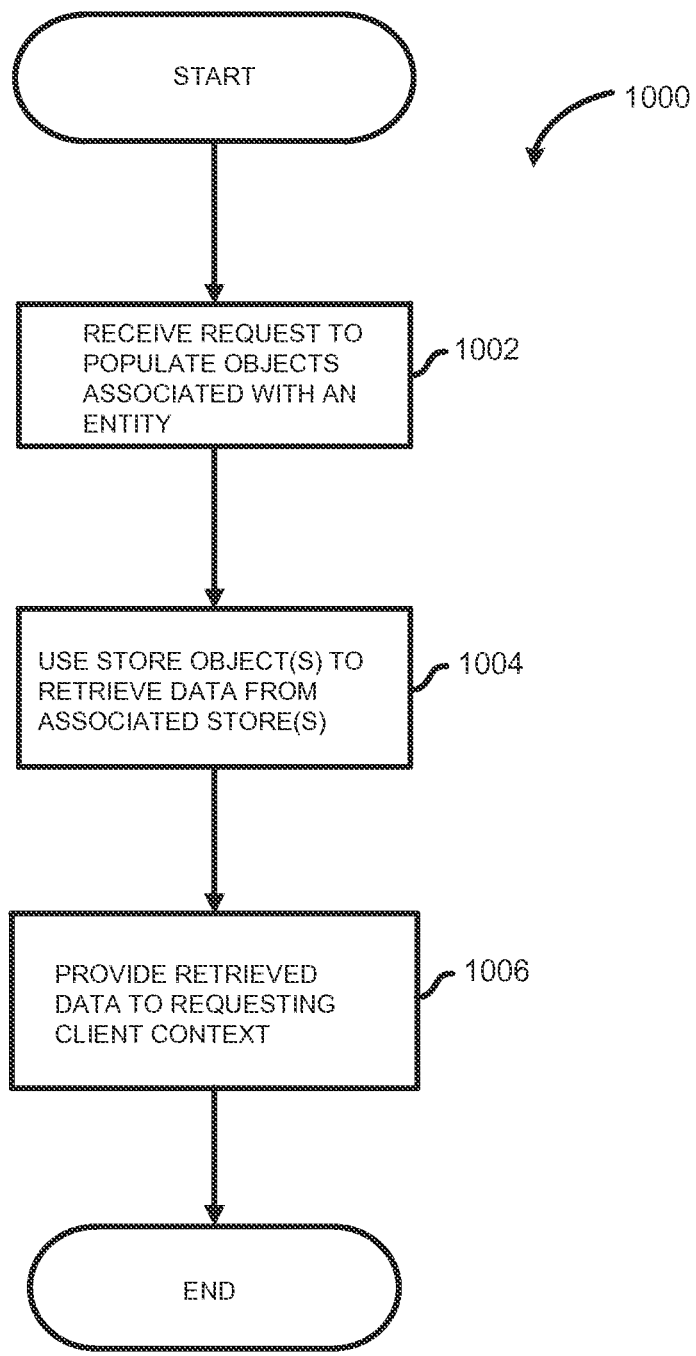
FIG. 10 illustrates an embodiment of a process used to retrieve (i.e. fetch) data from one or more persistent data stores.

FIG. 10 illustrates an embodiment of a process used to retrieve (i.e. fetch) data from one or more persistent data stores. In some embodiments, process 1000 is used to implement 710 of FIG. 7. In some embodiments, the process of FIG. 10 is implemented on a PSC. At 1002, a request from client context to populate one or more objects with data is received. In some embodiments, the request received at 1002 specifies the entity of the objects the client context desires to populate. In some embodiments, the request received at 1002 specifies one or more source stores to retrieve data from. In some embodiments, if the source store is not specified in the request received at 1002, the persistent store coordinator determines programmatically which stores to search. In some embodiments, the persistent store coordinator retrieves data from all available stores that have data associated with an entity associated with the request, determined for example based at least in part on configuration information received previously from the requesting client context indicating which entities are associated with each data store. At 1004, the persistent store coordinator uses the store object(s) of the source store(s) to retrieve data from the associated store(s). At 1006, the persistent store coordinator provides the retrieved data to the requesting client context. In some embodiments, the data is provided to the client context as if it originates from a single source, regardless of how many persistent stores were accessed to retrieve the data.

Figure 11:
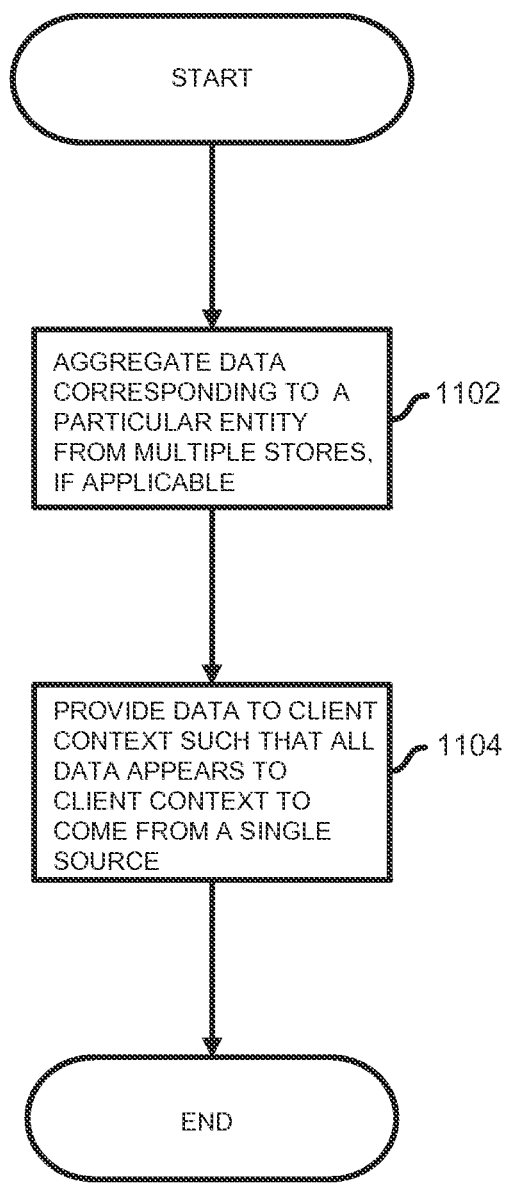
FIG. 11 illustrates an embodiment of a process used to retrieve data from multiple persistent data stores, if applicable.

FIG. 11 illustrates an embodiment of a process used to retrieve data from multiple persistent data stores, if applicable. In some embodiments, the process of FIG. 11 is used to implement 1006 of FIG. 10. As depicted in FIG. 11, at 1102 data retrieved from multiple stores is aggregated, if applicable. At 1104, the requested data is provided to the client context such that all data appears to the client context to come from a single source. Aggregating like data (i.e. data that corresponds to a particular entity) retrieved, where applicable, from multiple stores, sometimes referred to herein as "striping", allows the retrieval in a single operation of all the objects associated with an entity from all available and applicable persistent data stores. Such an approach enables the developer of the client context (e.g., application program) to look to the PSC as a single data source from which persistently stored data can be retrieved using a single interface, without requiring the developer to anticipate which types of data store may be used to persistently store data associated with the client context and without requiring the developer to know or write code to enable the client context to access directly the persistent data store that sits behind the PSC.

Figure 12:
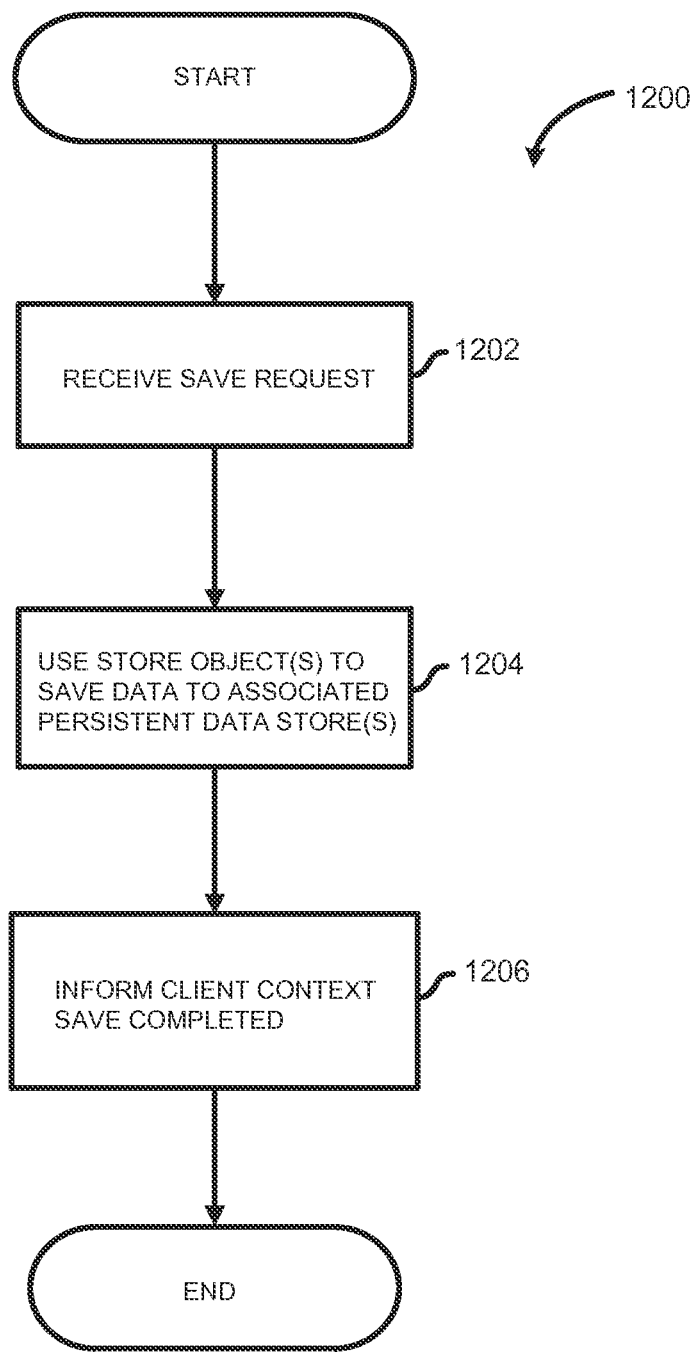
FIG. 12 illustrates an embodiment of a process used to save an object to one or more persistent data store(s) data associated with an object in memory.

FIG. 12 illustrates an embodiment of a process used to save an object to one or more persistent data store(s) data associated with an object in memory. In some embodiments, process 1200 is used to implement 710 of FIG. 7. At 1202, the persistent store coordinator receives a request from an associated client context to save an object in memory to one or more persistent data store(s). The request received at 1202 specifies the entity of the object the client context desires to save and the data to be saved. In some embodiments, the request received at 1202 specifies one or more destination store(s) to save the data associated with the object to. In some embodiments, the entity in the model of the persistent store coordinator that corresponds to the object the client context desires to save to persistent storage is associated with one or more destination store(s). If a destination store is not specified by a client context either when inserting an entity associated with a new type of object into the model of the persistent store coordinator (e.g., at 902 of FIG. 9) or when actually requesting an object to be saved (e.g., in 1202), in some embodiments, the persistent store coordinator saves the object to any available persistent data store that supports the data associated with the object. In some embodiments, the persistent store coordinator saves the object to the first store that can persist an object of that type. At 1204, the persistent store coordinator uses the store object(s) of the destination store(s) to save the data to the associated persistent data store(s). In some embodiments 1206 includes informing the client context when the save request is completed.

In some embodiments, the persistent store coordinator provides a "mirroring" functionality for objects stored in the persistent data stores. If a client context desires to save an instance or element of an object or entity at a primary store and also at a backup (i.e. mirror) store, the client can either specify the primary and mirror destination stores in a save request (e.g., 1202 of FIG. 12) or the information can be encapsulated within the model associated with the persistent store coordinator (e.g., at 902 of FIG. 9) and/or determined programmatically by the PSC. The persistent store coordinator subsequently remembers that the data associated with an object that is stored in primary and backup stores are mirrors of each other and that there is only one object associated with the two sets of data. The persistent store coordinator ensures that any changes saved to a mirrored object are saved at both the primary and mirror stores, i.e. the persistent store coordinator ensures that the data sets in the primary and mirror stores are always kept in sync with one another. When mirrored data is retrieved from persistent storage, the persistent store coordinator returns to a client context only a single object.

Figure 13:
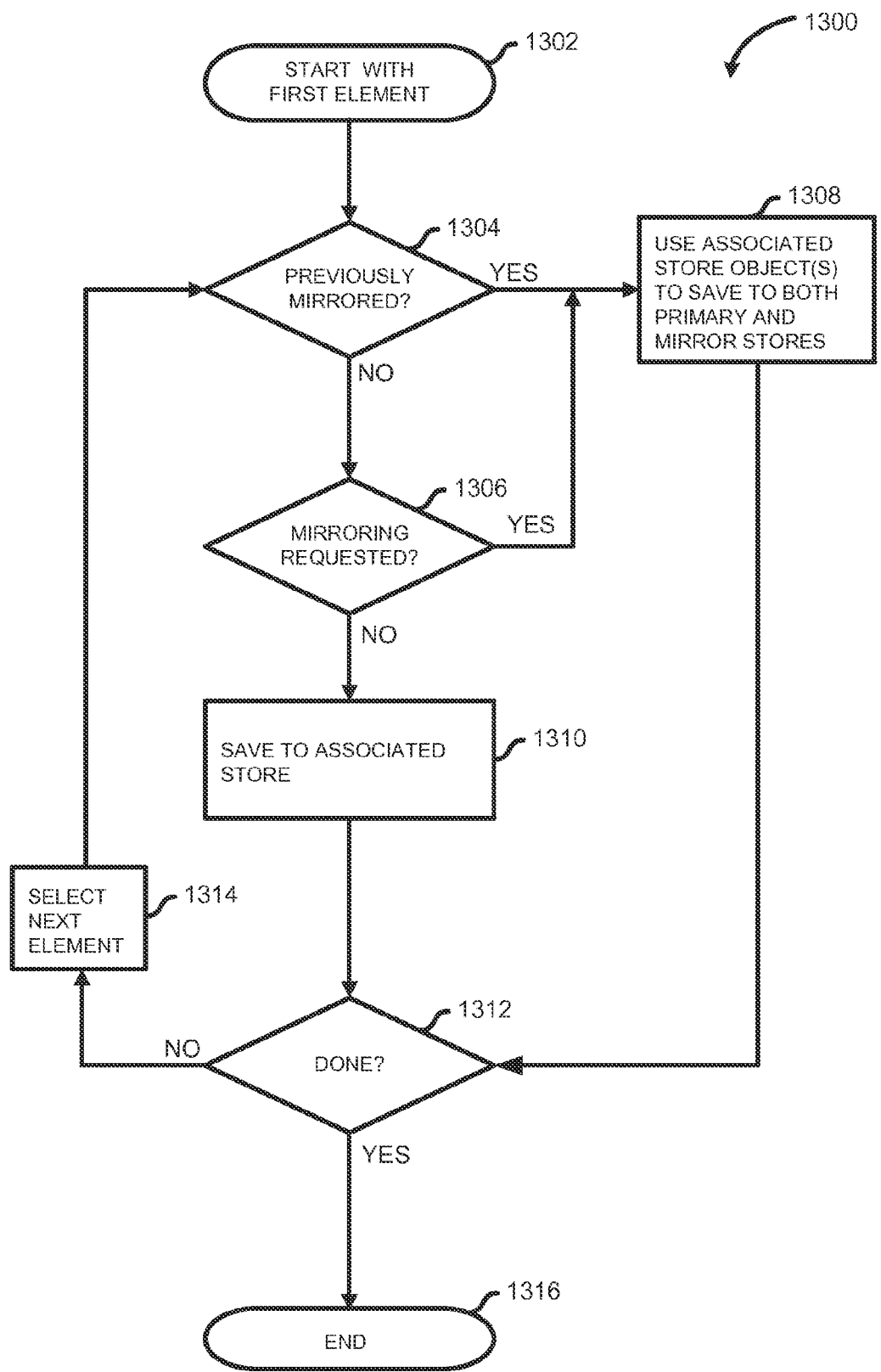
FIG. 13 illustrates an embodiment of a process used to save an object in memory to a primary store and a mirror store.

FIG. 13 illustrates an embodiment of a process used to save an object in memory to a primary store and a mirror store. In some embodiments, the process of FIG. 13 is implemented on a PSC configured to "mirror" data objects. In some embodiments, mirroring may be requested and/or specified for one or more elements of an object by a client context. Process 1300 starts at 1302 with the first element associated with an object for which a save request has been received. In some embodiments, a save request may apply to one or more objects of a type specified in the save request, in which case each individual instance of the object comprises one or more "elements" as referred to in FIG. 13. In some embodiments, an instance of an object may include more than one element of data, and each such element is treated as an "element" as that term is used in FIG. 13. At 1304 it is determined whether the current element was previously mirrored. In some embodiments, the model associated with the persistent store coordinator includes information pertaining to whether an element was previously mirrored (e.g., if the element is associated with more than one destination store). If it is determined at 1304 that the current element was not previously mirrored, it is determined at 1306 whether mirroring of the current element is requested with the current save. If it is determined at 1304 that the current element was previously mirrored or it is determined at 1306 that mirroring is requested for the current element with the current save, then at 1308 the persistent store coordinator uses the associated store object(s) to save the current element to both the primary and mirror stores. If it is determined at 1306 that mirroring of the current element is not requested, at 1310 the current element is saved to its associated destination store. At 1312 it is determined whether all elements associated with the save request have been saved. If it is determined at 1312 that all elements have not been saved, then the next element is selected at 1314, and process 1300 resumes from 1304. If it is determined at 1312 that all elements associated with the request have been saved, process 1300 ends at 1316.

In some embodiments, the persistent store coordinator provides means to "migrate" data from one persistent data store to another store which may be of the same type or a different type. Migration allows the conversion of data in a store from one type or format to another or the creation of a duplicate copy of the data in a store that is of the same type as the source store. For example, all the data stored in a SQL database can be exported to an XML file, to another SQL database, or to any other type of available persistent data store. Migration may be requested by one or more client contexts. However, since the client contexts are completely isolated from the manner in which data is stored in persistent storage, a migration operation in some embodiments is performed in a manner such that the move is transparent to affected objects and object graphs associated with the client contexts that use the migrated data. That is, the client contexts can continue working with their objects and object graphs even when the data underlying one or more of the objects is in the process of moving or has moved to a different location. The persistent store coordinator facilitates and tracks all data moves or migrations within and/or among the persistent data stores and updates the pointers for all affected objects in memory, e.g., by updating a model and/or one or more mappings associated with the PSC and the affected data and/or objects, so that objects in memory are always mapped to the correct persistent data store.

Figure 14:
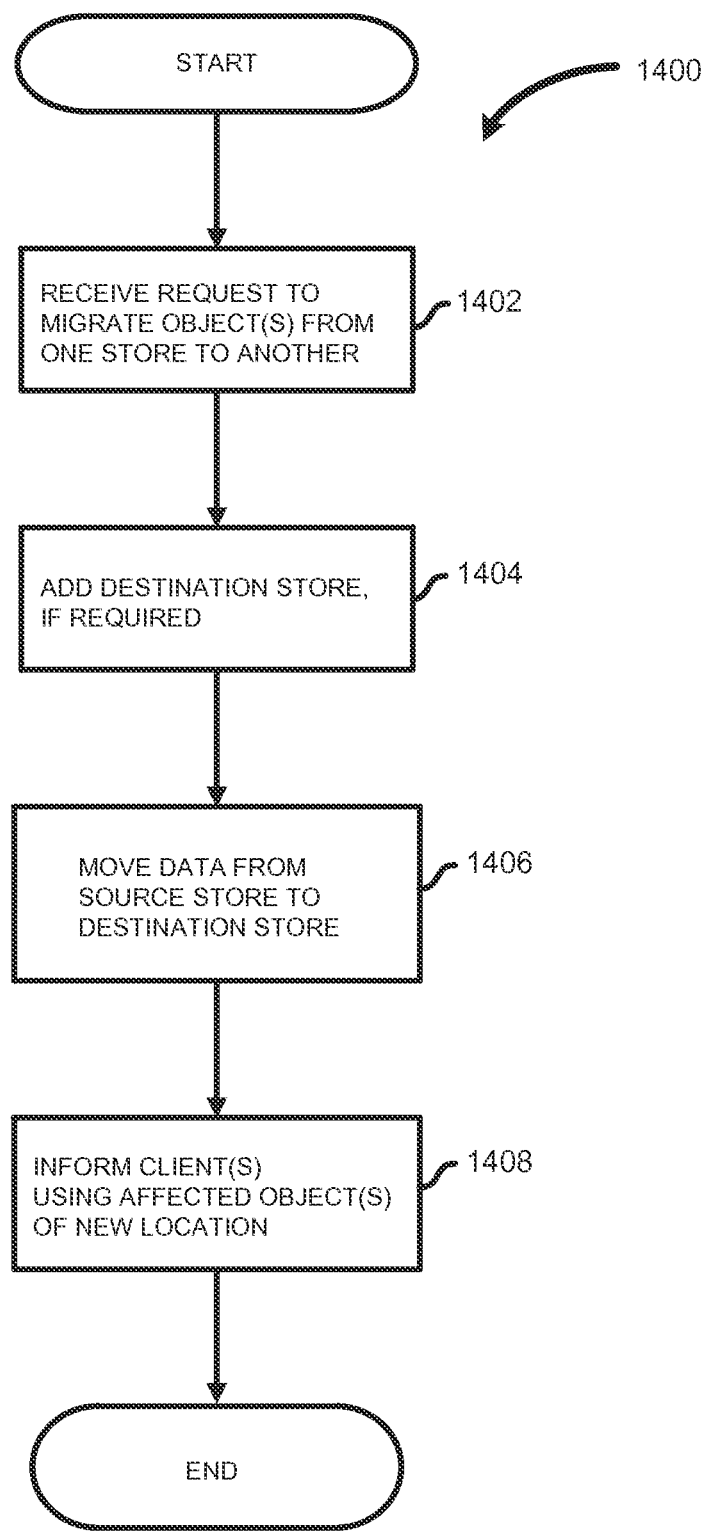
FIG. 14 illustrates an embodiment of a process used to migrate objects from one store to another.

FIG. 14 illustrates an embodiment of a process used to migrate objects from one store to another. In some embodiments, the process of FIG. 14 is implemented by a PSC. At 1402, a request is received from an associated client context to migrate one or more objects(s) from one store to another. The request received at 1402 includes the source store and the destination store, both of which may be specified by a URI. In some embodiments, the request received at 1402 also includes the destination store type. If the destination store type is not specified in the request received at 1402, it can be dynamically determined by the persistent store coordinator, e.g., by "sniffing" into the metadata of a file associated with the destination store. At 1404, a destination store is added if it is required (e.g., if the request of 1402 included a request to add a specific destination store). In some embodiments, 1404 includes instantiating a store object for the destination store. At 1406, the store object(s) associated with the source and destination stores are used to move data from the source store to the destination store. Although the operation of client contexts and their associated objects is not affected by the migration of process 1400, in some embodiments, the persistent store coordinator informs any clients using any affected objects of the new location of the objects in persistent storage at 1408. A new location may be specified by a URI. 1408 of process 1400 is useful for a client context if it ever needs to specify during a subsequent operation (e.g., saving data, retrieving data, etc.) a source and/or destination store which has been affected by the migration of process 1400.

Figure 15:
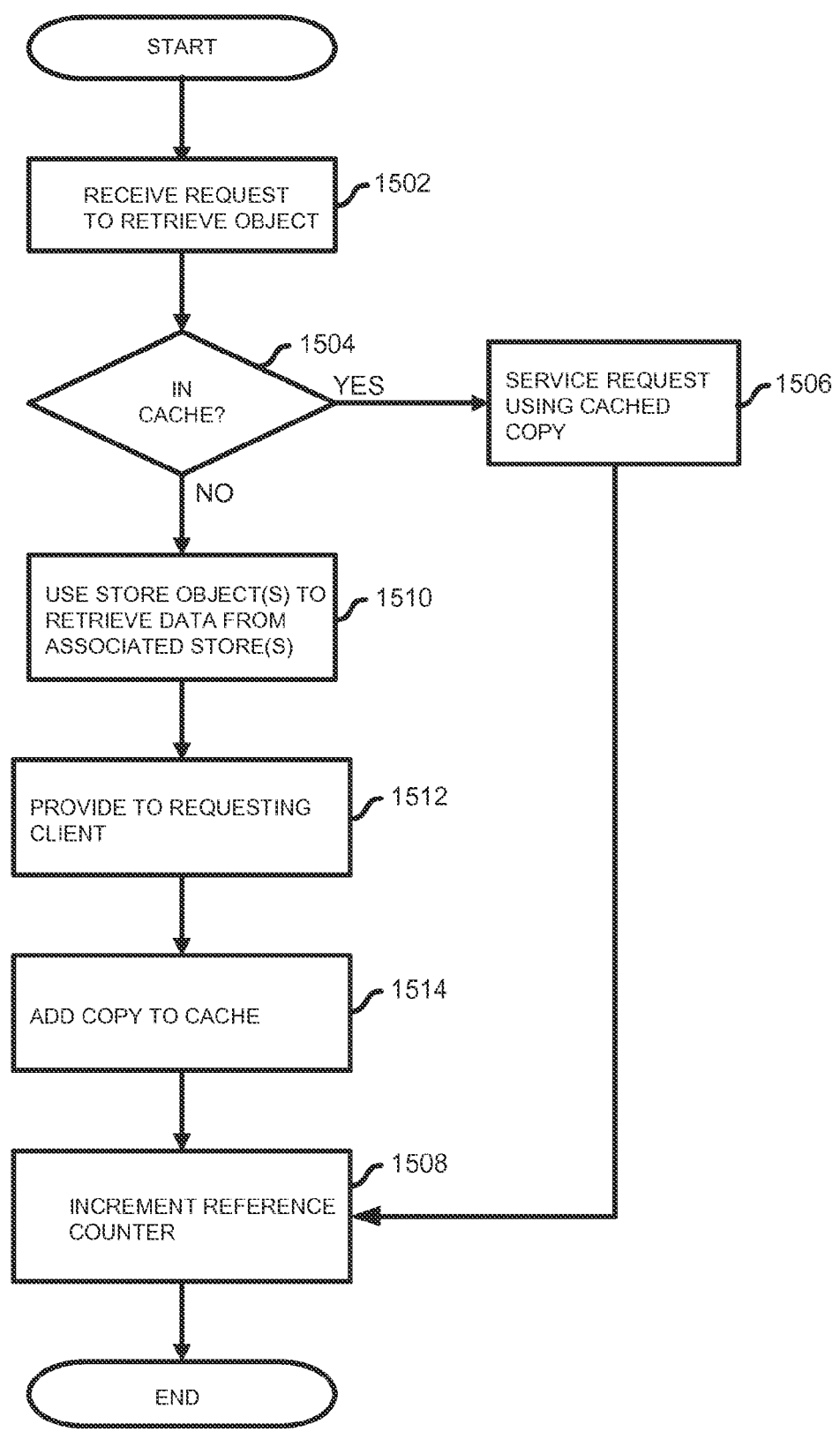
FIG. 15 illustrates an embodiment of a process used to cache retrieved data and service client requests using cached copies, if possible.

In some embodiments, a persistent store coordinator caches data each time a client retrieves an object from a persistent data store. FIG. 15 illustrates an embodiment of a process used to cache retrieved data and service client requests using cached copies, if possible. At 1502, a request to retrieve or fetch an object is received from an associated client context. It is determined at 1504 whether the object requested in 1502 is in cache. If it is determined at 1504 that the object requested in 1502 is in cache, the request of 1502 is serviced at 1506 using the cached copy. In some embodiments, a reference counter is employed for each object stored in cache to determine whether any client contexts are using the object. Thus, upon servicing a request using a cached copy at 1506, the reference counter associated with the requested object is incremented at 1508. If it is determined at 1504 that the object requested in 1502 is not in cache, at 1510 the store object(s) associated with the source store(s) associated with the requested object are used to retrieve data from the associated persistent data store(s). At 1512 the data retrieved at 1510 is provided to the requesting client. At 1514 the persistent store coordinator adds a copy of the object retrieved at 1510 to its cache and at 1508 increments (to a value of "1", e.g.) a reference counter associated with the newly-cached object.

Figure 16:
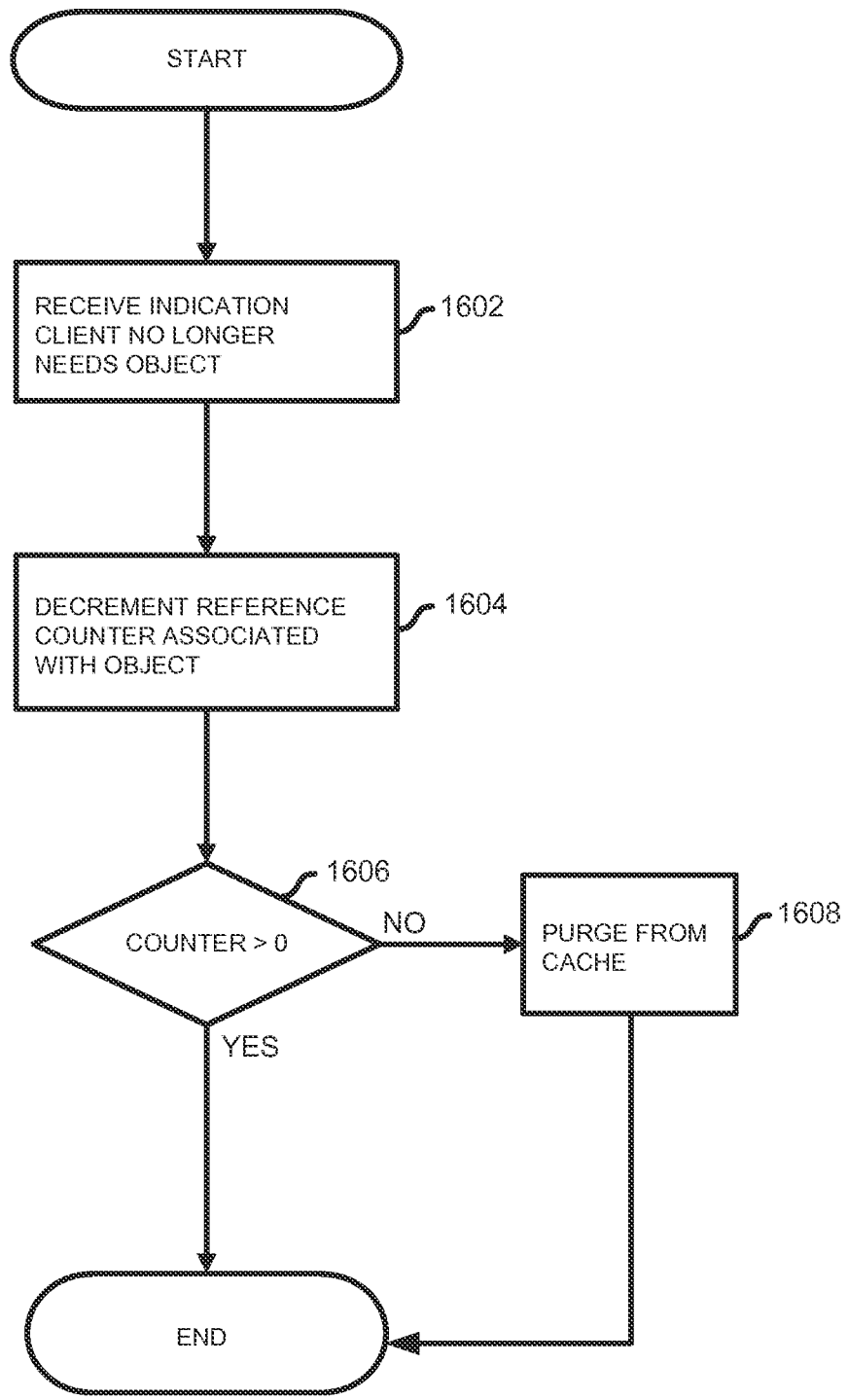
FIG. 16 illustrates an embodiment of a process used to purge cached copies of objects that are no longer in use by any clients.

FIG. 16 illustrates an embodiment of a process used to purge cached copies of objects that are no longer in use by any clients. At 1602 an indication is received from an associated client context that it no longer needs a particular object. At 1604 the reference counter associated with the object specified in 1602 is decremented. At 1606 it is determined whether the reference counter is greater than zero. If it is determined at 1606 that the reference counter is not greater than zero, it is concluded that no client contexts are using the object, and the object is purged from cache at 1608. If it is determined at 1606 that the reference counter is greater than zero, then it is concluded that at least one client context is using the object, and, therefore, the object is maintained in cache.

Figure 17:
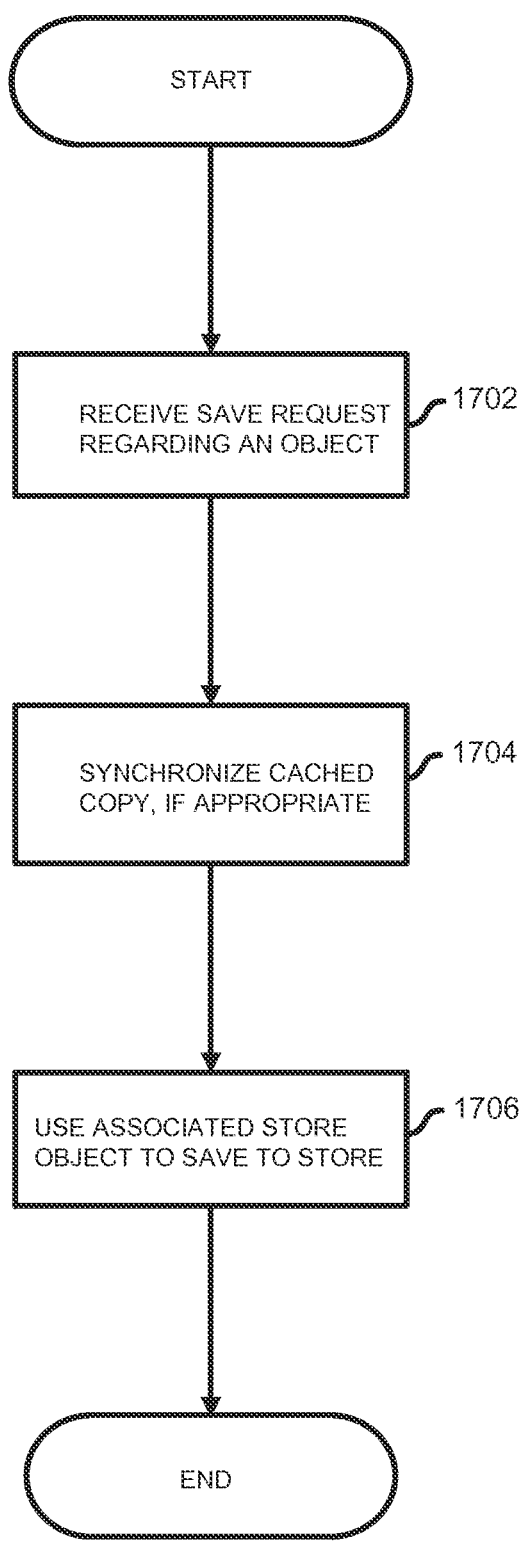
FIG. 17 illustrates an embodiment of a process used to synchronize a cached copy with its associated persisted data, if appropriate.

FIG. 17 illustrates an embodiment of a process used to synchronize a cached copy with its associated persisted data, if appropriate. At 1702 a save request regarding an object is received from an associated client. At 1704 the cached copy of the object requested to be saved in 1702 is synchronized with the associated data as it is to be saved per the save request received in 1702 (i.e. the changes are saved to the cached copy), if appropriate (e.g., if the cached copy is not to be purged). At 1706, the store object of the destination store of the object requested to be save at 1702 is used to save the object to its associated store.

Figure 18:
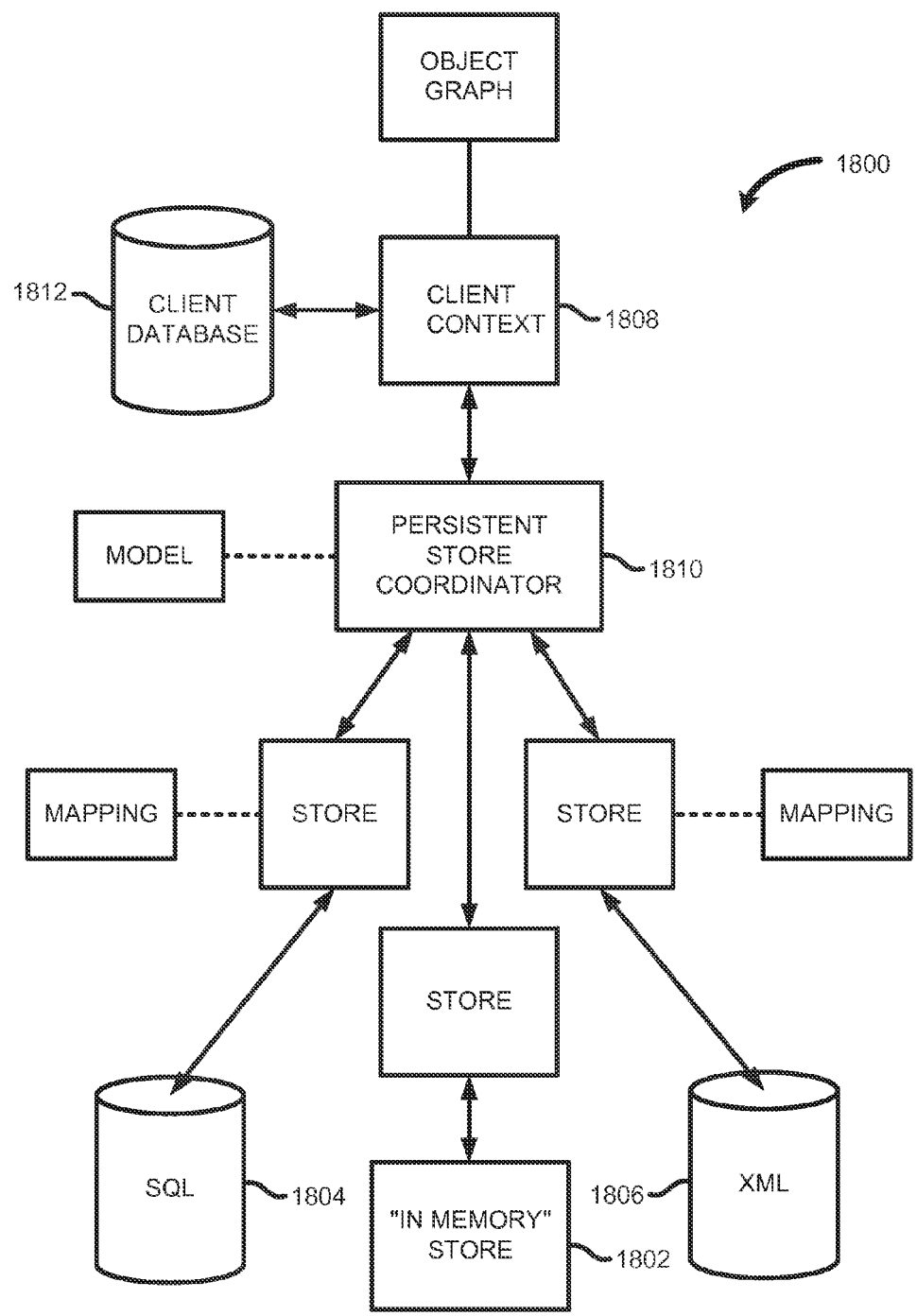
FIG. 18 illustrates an embodiment of an environment in which the persistent store coordinator manages communication between a client context and available persistent data stores, one of which is an "in-memory" store.

FIG. 18 illustrates an embodiment of an environment in which the persistent store coordinator manages communication between a client context and available persistent data stores, one of which is an "in-memory" store. In some embodiments, an in-memory store is used to enable a client context to temporarily store data that is not associated with a persistent data store accessible via a PSC associated with the client context and in some embodiments make such data available to other client contexts via a PSC. As depicted in environment 1800, the functionality of an in-memory store 1802 is the same as persistent data stores, such as SQL database 1804 and XML file 1806. The only difference between an in-memory store and other stores is that the in-memory store is "in-memory" and is not written to disk, removable storage media, etc. by operation of the PSC (i.e., the PSC is not involved in storing the data persistently). When a client context (e.g., 1808) requests its associated persistent store coordinator (e.g., 1810) to add an in-memory store, the client context provides the persistent store coordinator with the configuration of the in-memory store, as it does when adding any other persistent data store. However, because the store is "in-memory", the client context does not need to specify a URL designating the location of the store when requesting the persistent store coordinator to add the store. In some embodiments, the in-memory store may never be persistently stored. In some embodiments, however, a client context maintains its own persistent data store (e.g. client database 1812). Such an "in memory" store enables a client context to use its own proprietary data format (or other format not supported by the PSC) to persistently store the data temporarily stored in the in-memory store. The in-memory store allows a client context to make use of the functionality of environment 1800 while allowing the client context to maintain its custom data format. In some embodiments, an "in memory" store may be used as a "scratch pad" shared by two or more client contexts.

Figure 19:
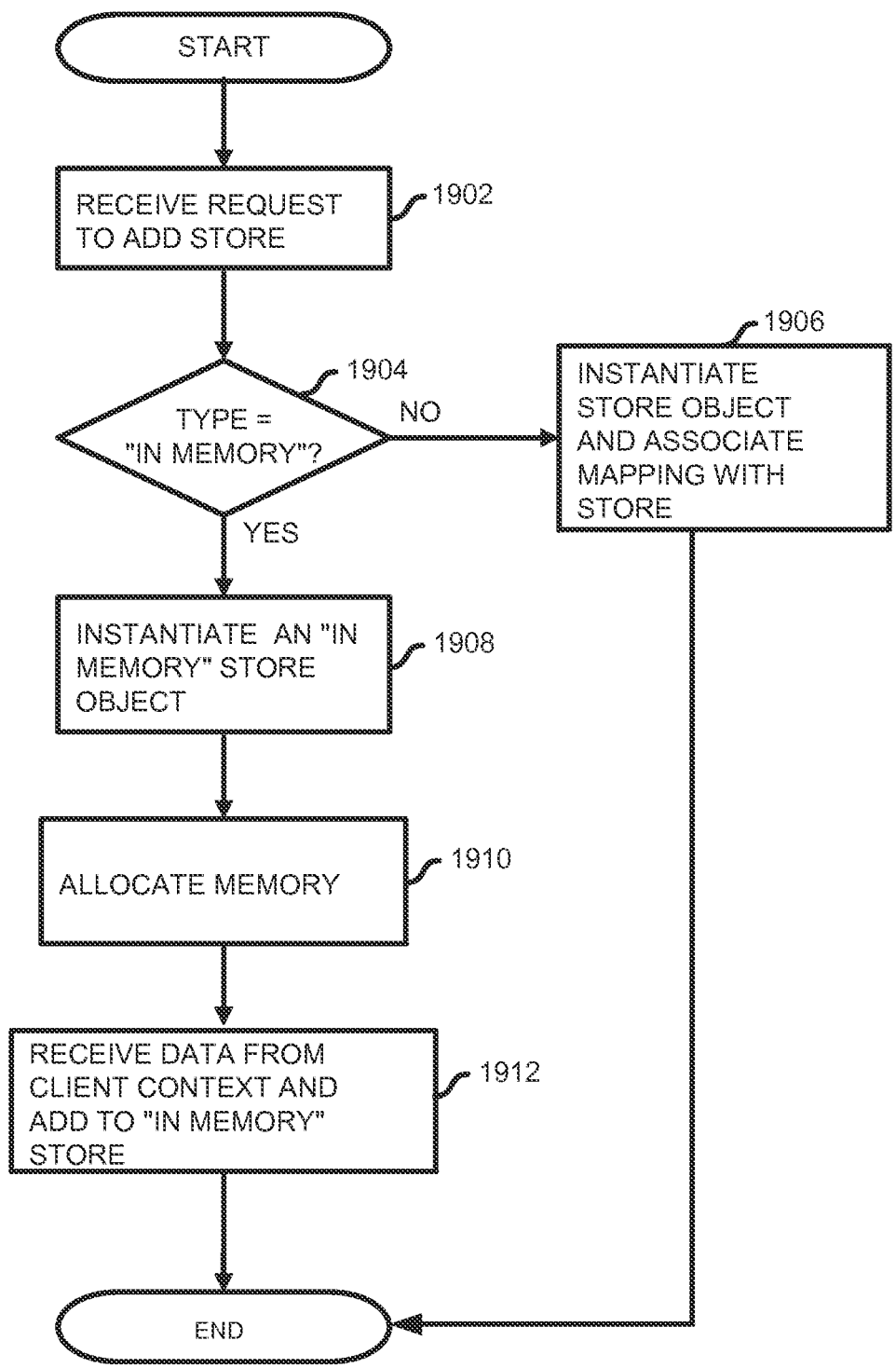
FIG. 19 illustrates an embodiment of a process used to add a store, including an in-memory store.

FIG. 19 illustrates an embodiment of a process used to add a store, including an in-memory store. At 1902 a request to add a store is received from a client context. It is determined at 1904 whether the type of store requested at 1902 to be added is "in-memory". If it is determined at 1904 that the type of the store requested at 1902 to be added is not "in-memory", at 1906 a store object is instantiated and a mapping is associated with the store as in process 800 of FIG. 8. If it is determined at 1904 that the type of the store requested to be added at 1902 is "in-memory", at 1908 an "in-memory" store object is instantiated. At 1910, memory is allocated for the in-memory store. At 1912, data is received from the client context and added to the in-memory store. The data then becomes available via the PSC to the client context that provided the data and, if configured, to other client contexts associated with the PSC.

The approaches described herein enable one or more client contexts to be provided with access to a potentially dynamically changing set of persistent data stores, and data from multiple persistent stores may be accessed by and/or presented to one or more client contexts as if from a single data source. Using the approaches described above simplifies the development of client application programs and provides continuous access to those persistent data stores that remain available even as data stores are added or removed, expectedly or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing objects from multiple persistent stores, comprising:

retrieving, using a processor, data objects from two or more of a plurality of persistent data stores;

providing, to a client context initialized by a client application, the data objects used by the client application, wherein the plurality of persistent data stores appear to the client context to comprise a single source, and wherein the client context manages a client object graph of the data objects from the two or more of the plurality of persistent data stores used by the client application, the client object graph being a representation of the data objects and pointers indicating a relationship between the data objects; and in the event that a persistent data store from which the data objects were retrieved becomes unavailable:
  informing the client context to update the client object graph that includes a pointer between an available data object and an affected data object that is no longer available at the client context, and
  continuing to make available to the client context without interruption those of the data objects that are not stored in the unavailable persistent data store.

2. A method as recited in claim 1, further comprising:
receiving an indication that a removed store of the plurality of persistent data stores has become unavailable; and
informing the client context that a removed data object stored in the removed store is no longer available.

3. A method as recited in claim 1, wherein informing the client context includes pruning the client object graph that contains the pointer between the available data object and the affected data object.

4. A method as recited in claim 1, further comprising receiving from the client context a request to retrieve the data objects.

5. A method as recited in claim 1, further comprising constructing a model that represents the data objects and their relationship, to one another.

6. A method as recited in claim 5, wherein constructing the model includes receiving from the client context a definition of one or more types of objects referenced by the client context.

7. A method as recited in claim 1, wherein the plurality of persistent data stores comprises data stores of two or more types and retrieving the data objects from two or more of the plurality of persistent data stores includes sending to each of the two or more of the plurality of persistent data stores a query in a form suitable for that persistent data store.

8. A method as recited in claim 1, wherein the plurality of persistent data stores comprises data stores of two or more types and the method further comprises receiving in a format not specific to any persistent data store type a request to retrieve the data objects.

9. A method as recited in claim 1, further comprising receiving a request to add a new persistent data store to the plurality of persistent data stores, adding the new persistent store, and retrieving from the persistent store one or more additional data objects referenced by the client context.

10. A method as recited in claim 9, further comprising informing the client context of the availability of the one or more additional data objects.

11. A method as recited in claim 9, further comprising providing the one or more additional data objects to the client context.

12. A method as recited in claim 1, further comprising receiving a request to store a new data object persistently, and storing the new data object in one of the plurality of persistent data stores.

13. A method as recited in claim 1, further comprising migrating one or more of the data objects from a first persistent data store to a second persistent data store and continuing to make the migrated one or more data objects available to the client context.

14. A method as recited in claim 13, further comprising informing the client context that the migrated one or more data objects are now stored in the second persistent data store.

15. A method as recited in claim 13, wherein the migration is performed in a manner that is transparent to the client context and the migrated one or more data objects remain available to the client context after the migration in the same manner as before the migration.

16. A method as recited in claim 1, further comprising storing in a cache a cache copy of one or more of the retrieved data objects.

17. A method as recited in claim 1, wherein retrieving the data objects from two or more of a plurality of persistent data stores includes determining whether a previously-retrieved copy of one or more of the data objects is stored in a cache.

18. A method as recited in claim 1, further comprising saving in each persistent data store, in a manner not specific to any particular type of persistent data store, metadata of the persistent data store.

19. A system for managing objects from multiple persistent stores, comprising:
  a processor configured to:
    retrieve data objects from two or more of a plurality of persistent data stores;
    provide, to a client context initialized by a client application, the data objects used by the client application, wherein the plurality of persistent data stores appear to the client context to comprise a single source, and wherein the client context manages a client object graph of the data objects from the two or more of the plurality of persistent data stores used by the client application, the client object graph being a representation of the data objects and pointers indicating a relationship between the data objects; and
    in the event that a persistent data store from which the data objects were retrieved becomes unavailable:
      inform the client context to update the client object graph that includes a pointer between an available data object and an affected data object that is no longer available at the client context, and
      continue to make available to the client context without interruption those of the data objects that are not stored in the unavailable persistent data store; and
  a memory coupled to the processor and configured to provide instructions to the processor.

20. A system as recited in claim 19, wherein the processor is further configured to:
receive an indication that a removed store of the plurality of persistent data stores has become unavailable; and
inform the client context that a removed data object stored in the removed store is no longer available.

21. A system as recited in claim 19, wherein to inform the client context includes pruning the client object graph that contains the pointer between the available data object and the affected data object.

22. A system as recited in claim 19, wherein the processor is further configured to construct a model that represents the data objects and their relationship, to one another.

23. A system as recited in claim 19, wherein the plurality of persistent data stores comprises data stores of two or more types and the processor is configured to retrieve the data objects from two or more of the plurality of persistent data stores including by sending to each of the two or more of the plurality of persistent data stores a query in a form suitable for that persistent data store.

24. A computer program product for managing objects from multiple persistent stores, the computer program product being embodied in a computer readable medium and comprising computer instructions for:
  retrieving data objects from two or more of a plurality of persistent data stores;
  providing, to a client context initialized by a client application, the data objects used by the client application, wherein the plurality of persistent data stores appear to the client context to comprise a single source, and wherein the client context manages a client object graph of the data objects from the two or more of the plurality of persistent data stores used by the client application, the client object graph being a representation of the data objects and pointers indicating a relationship between the data objects; and in the event that a persistent data store from which the data objects were retrieved becomes unavailable:

informing the client context to update the client object graph that includes a pointer between an available data object and an affected data object that is no longer available at the client context, and continuing to make available to the client context without interruption those of the data objects that are not stored in the unavailable persistent data store.

25. A computer program product as recited in claim 24, further comprising computer instructions for:

receiving an indication that a removed store of the plurality of persistent data stores has become unavailable; and informing the client context that a removed data object stored in the removed store is no longer available.

26. A computer program product as recited in claim 24, wherein informing the client context includes pruning the client object graph that contains the pointer between the available data object and the affected data object.

27. A computer program product as recited in claim 24, wherein the plurality of persistent data stores comprises data stores of two or more types and retrieving the data objects from two or more of the plurality of persistent data stores includes sending to each of the two or more of the plurality of persistent data stores a query in a form suitable for that persistent data store.

* * * * *